United States Patent
Varadarajan et al.

(10) Patent No.: US 7,574,406 B2
(45) Date of Patent: Aug. 11, 2009

(54) SYSTEM AND METHOD MAXIMIZING VIDEO LICENSE UTILIZATION USING BILLBOARD SERVICES

(75) Inventors: Sridhar Varadarajan, Bangalore (IN); Sridhar Gangadharpacci, Bangalore (IN); Harish Gurudutt Kammanahalli, Bangalore (IN); Korrapati Kalyana Rao, Bangalore (IN)

(73) Assignee: Satyam Computer Services Limited of Mayfair Centre, Hyderabad (IN)

(*) Notice: Subject to any disclaimer, the term of this patent is extended or adjusted under 35 U.S.C. 154(b) by 763 days.

(21) Appl. No.: 10/401,546

(22) Filed: Mar. 31, 2003

(65) Prior Publication Data

US 2004/0193544 A1 Sep. 30, 2004

(51) Int. Cl.
  *H04L 9/00* (2006.01)
(52) U.S. Cl. .............................................. 705/59
(58) Field of Classification Search ............. 705/50–59; 713/155–186; 726/1–36
  See application file for complete search history.

(56) References Cited

U.S. PATENT DOCUMENTS

| 5,204,897 | A | * | 4/1993 | Wyman ..................... 710/200 |
| 5,797,126 | A | | 8/1998 | Helbling et al. |
| 6,424,998 | B2 | | 7/2002 | Hunter |
| 6,496,809 | B1 | | 12/2002 | Nakfoor |
| 6,785,713 | B1 | * | 8/2004 | Freeman et al. ............. 709/208 |
| 6,901,386 | B1 | * | 5/2005 | Dedrick et al. ................ 705/59 |
| 2002/0174051 | A1 | * | 11/2002 | Wise ............................ 705/37 |
| 2004/0010471 | A1 | * | 1/2004 | Lenard et al. ................. 705/59 |
| 2004/0039916 | A1 | * | 2/2004 | Aldis et al. ................. 713/177 |
| 2004/0088730 | A1 | * | 5/2004 | Gopalan et al. .............. 725/93 |

OTHER PUBLICATIONS

"Business Briefing", The san Diego Union—Tribune, San Diego, Calif., Apr. 3, 2002, p. C.2.*
Lui et al., "Participation Incentive Mechanisms in Peer-to-Peer Subscription Systems", Computer Society, Jan. 2002.
Kwok et al., "A License Management Model to Support B2C and C2C Music Sharing", Departmen tof Information and Systems Management, Hong Kong University, May 2001.

* cited by examiner

Primary Examiner—Mary Cheung
(74) Attorney, Agent, or Firm—Venable LLP; Jeffri A. Kaminski

(57) ABSTRACT

Key to overall video license utilization lies in a cooperative sharing of licenses between the different branch operators of the licenses before the expiry of the licenses. A branch operator has a region of operation and stimulating the demand for licenses that are about to expire across multiple regions increases the overall license utilization. Billboard service provides subscribers with information and facility to preview and select movies for viewing online and it provides an opportunity for branch operators and central operator to maximize the utilization of available licenses. Central billboard provides a platform for branch operators to submit and trade their surplus licenses while a local billboard that is part of a branch operator infrastructure helps create demand for such surplus licenses. Central billboard supports both regulated and unregulated pricing and trading thereby enhancing the chances of trading of licenses that are about to expire.

13 Claims, 19 Drawing Sheets

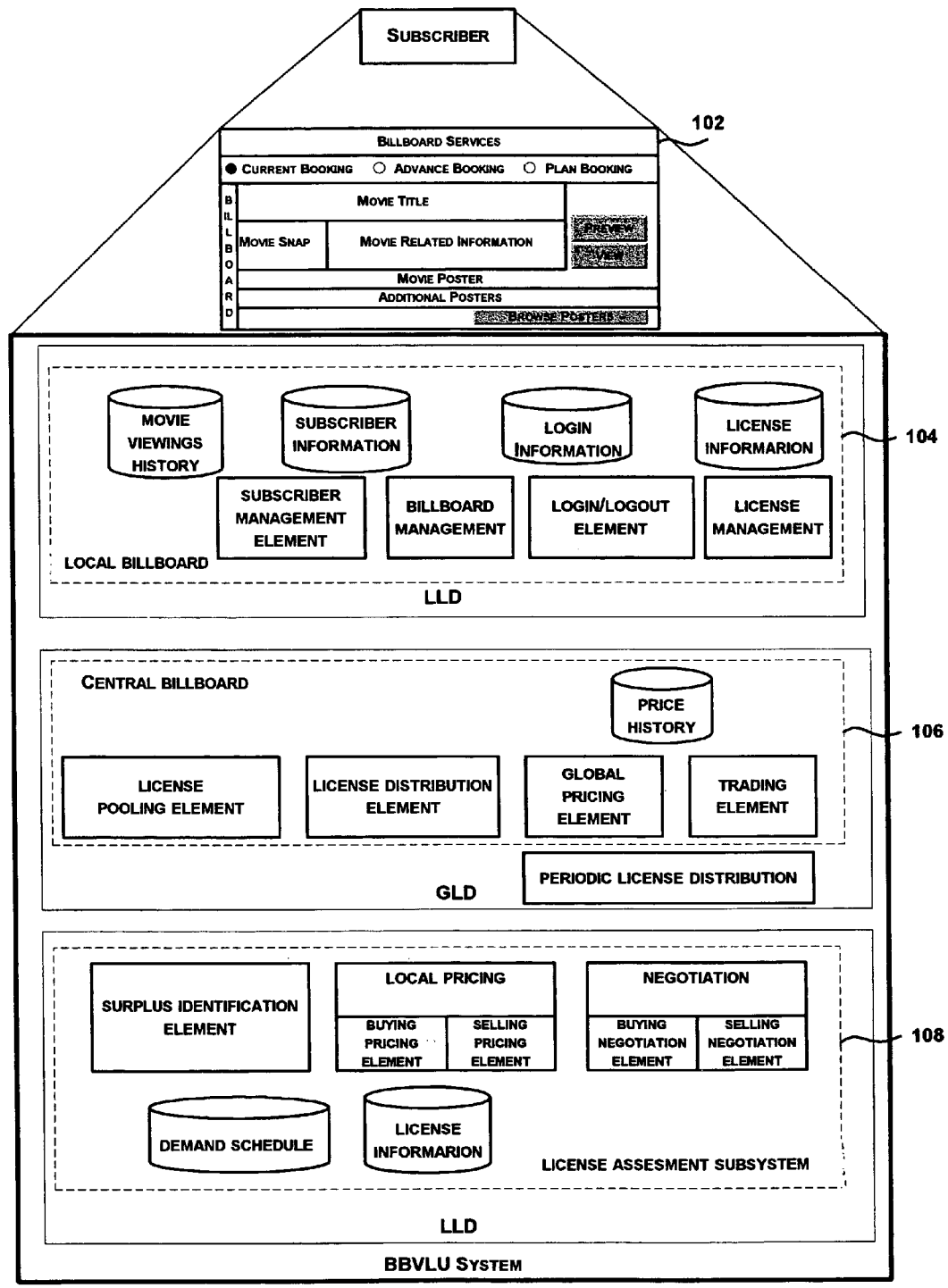
FIG. 1: BBVLU SYSTEM ARCHITECTURE

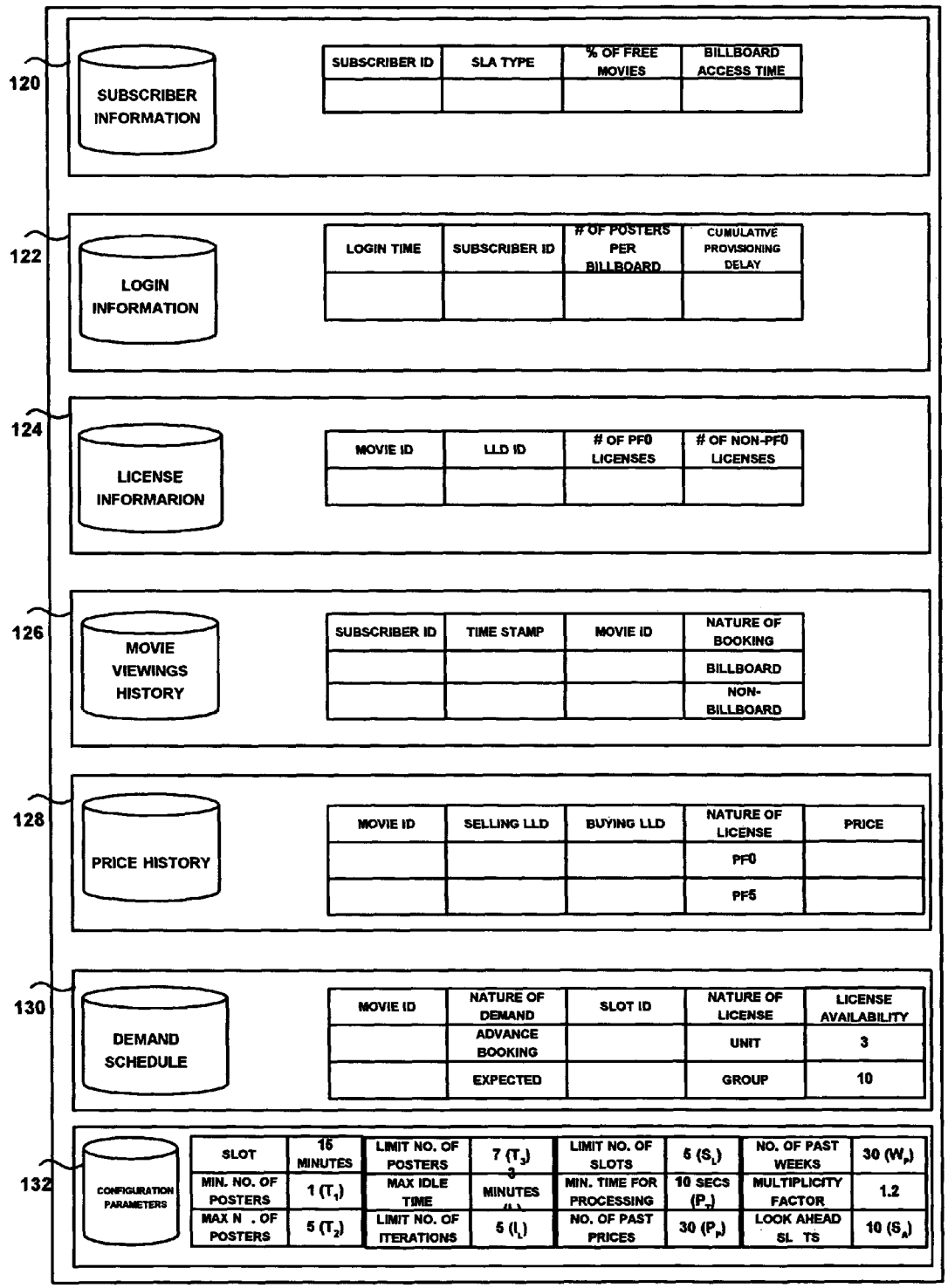
FIG. 1A: BRIEF DESCRIPTION OF DATABASES

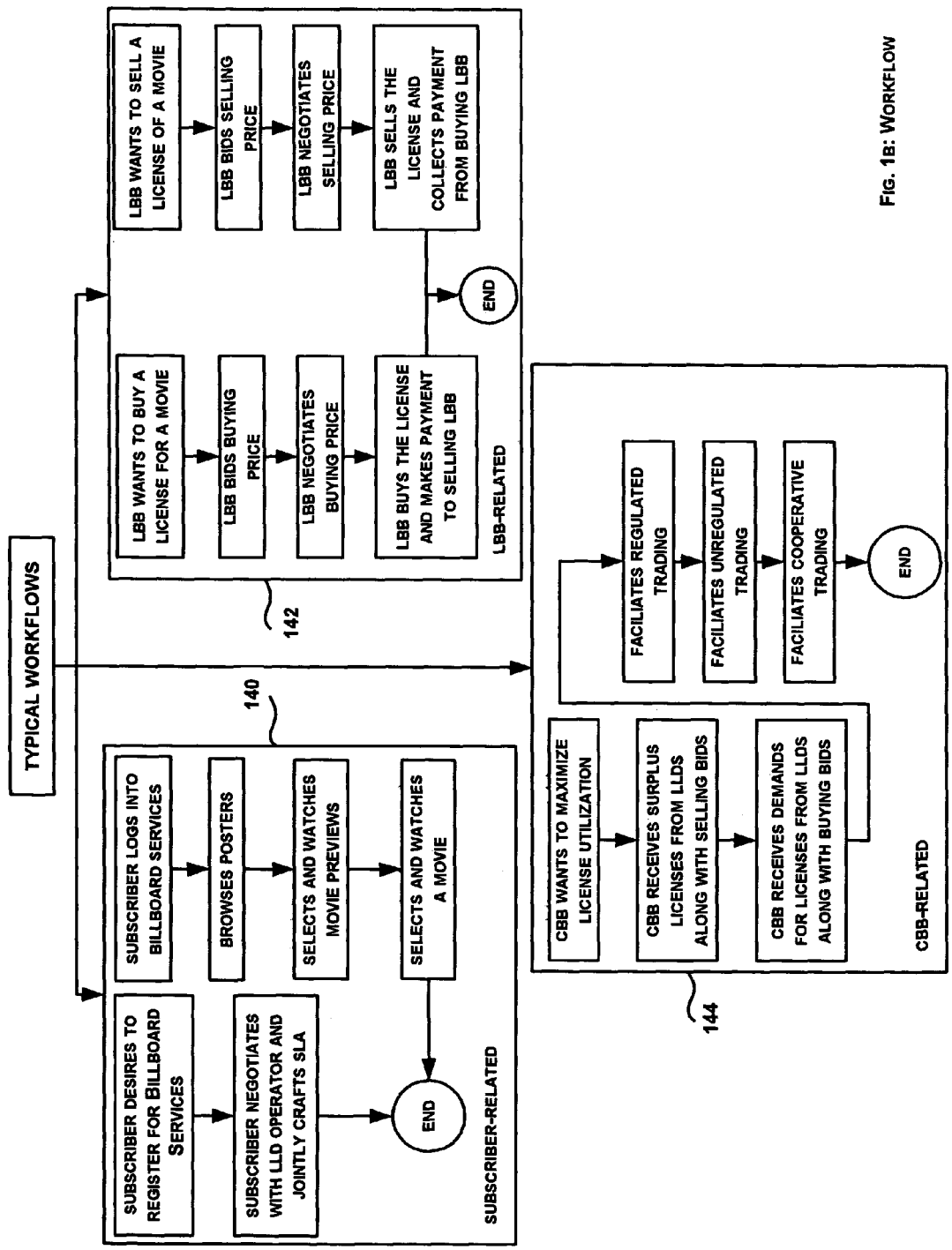
Fig. 1B: Workflow

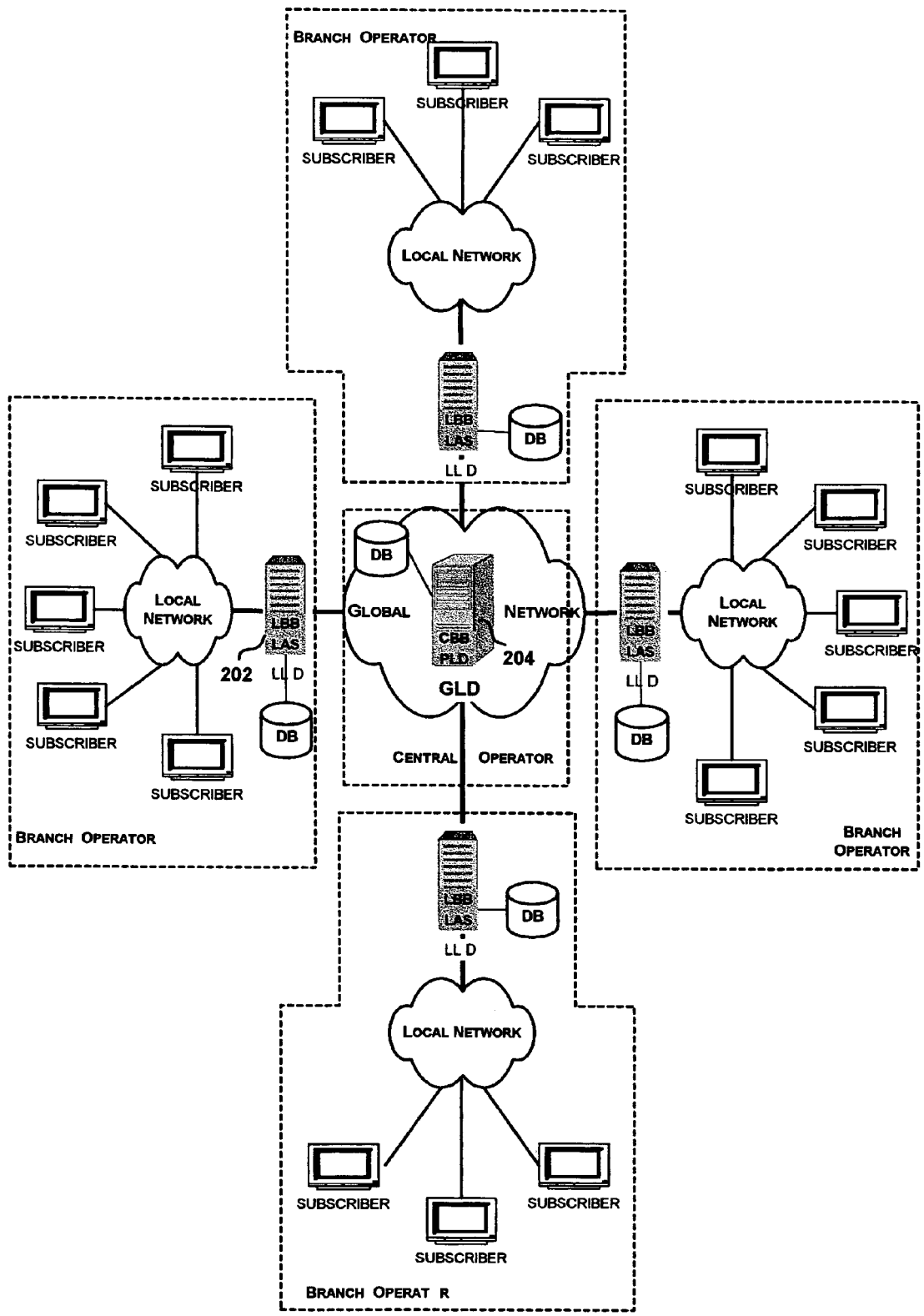
FIG 2: NETWORK ARCHITECTURE

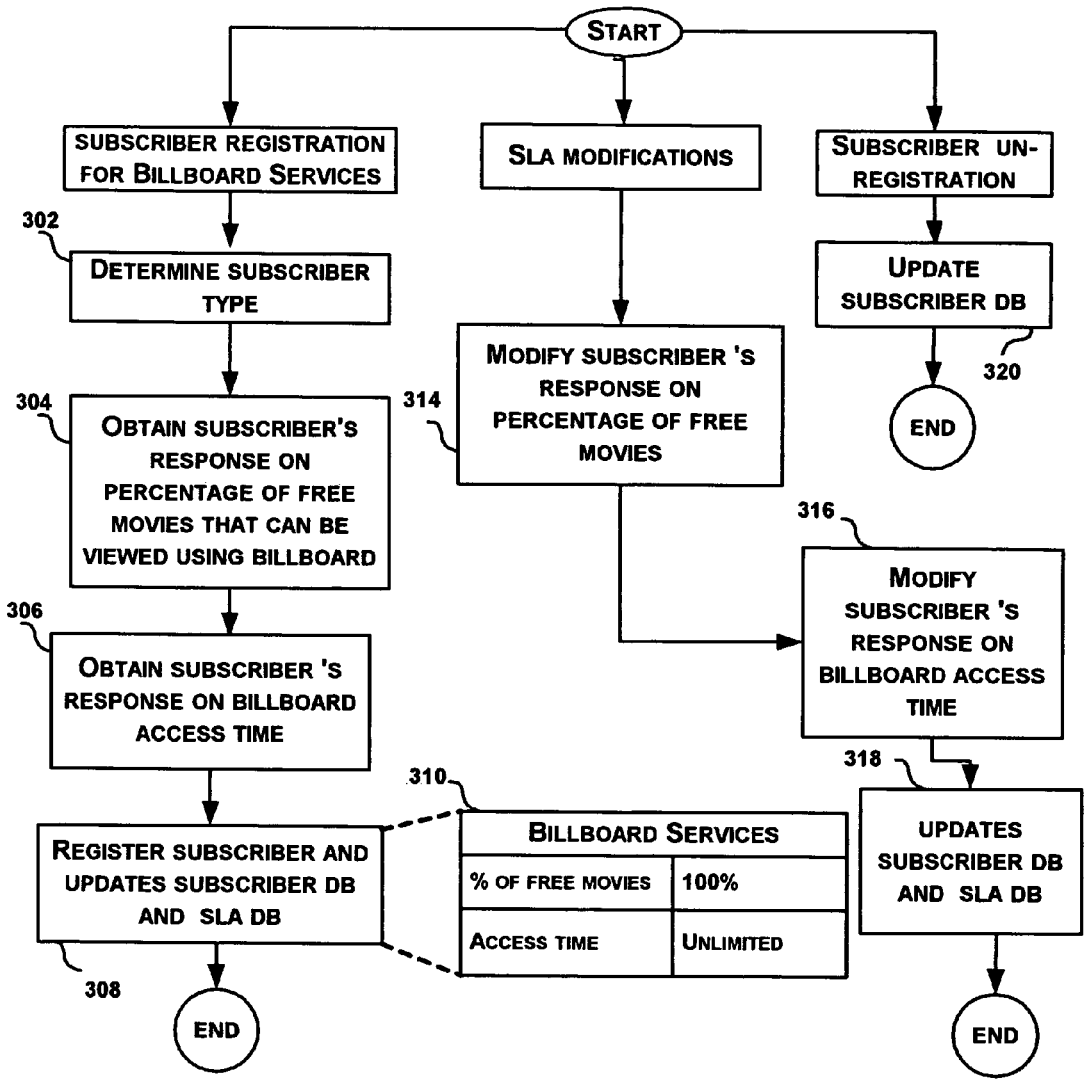
FIG. 3: BILLBOARD SUBSCRIPTION PROCEDURE

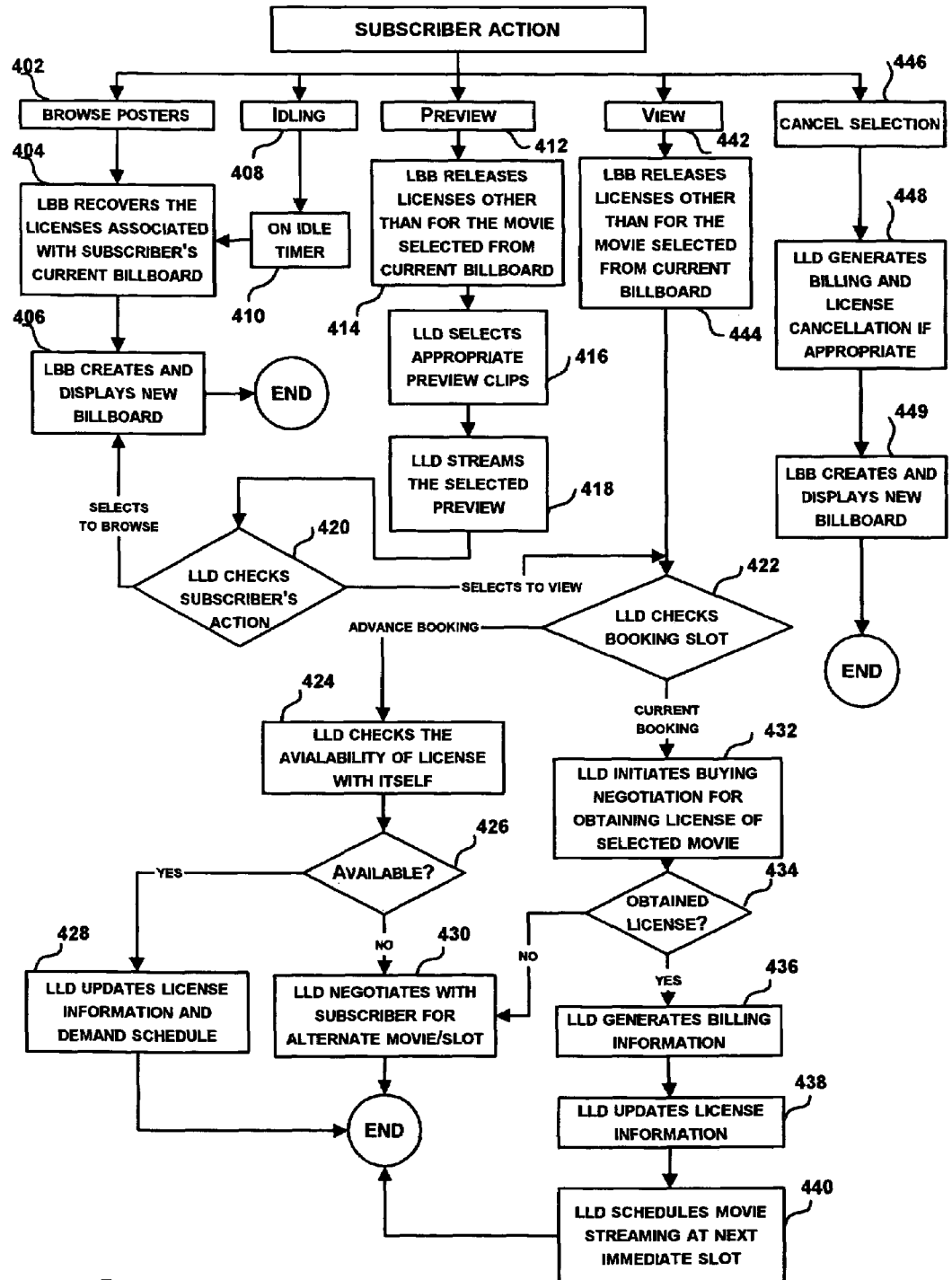
FIG. 4: BILLBOARD MANAGEMENT

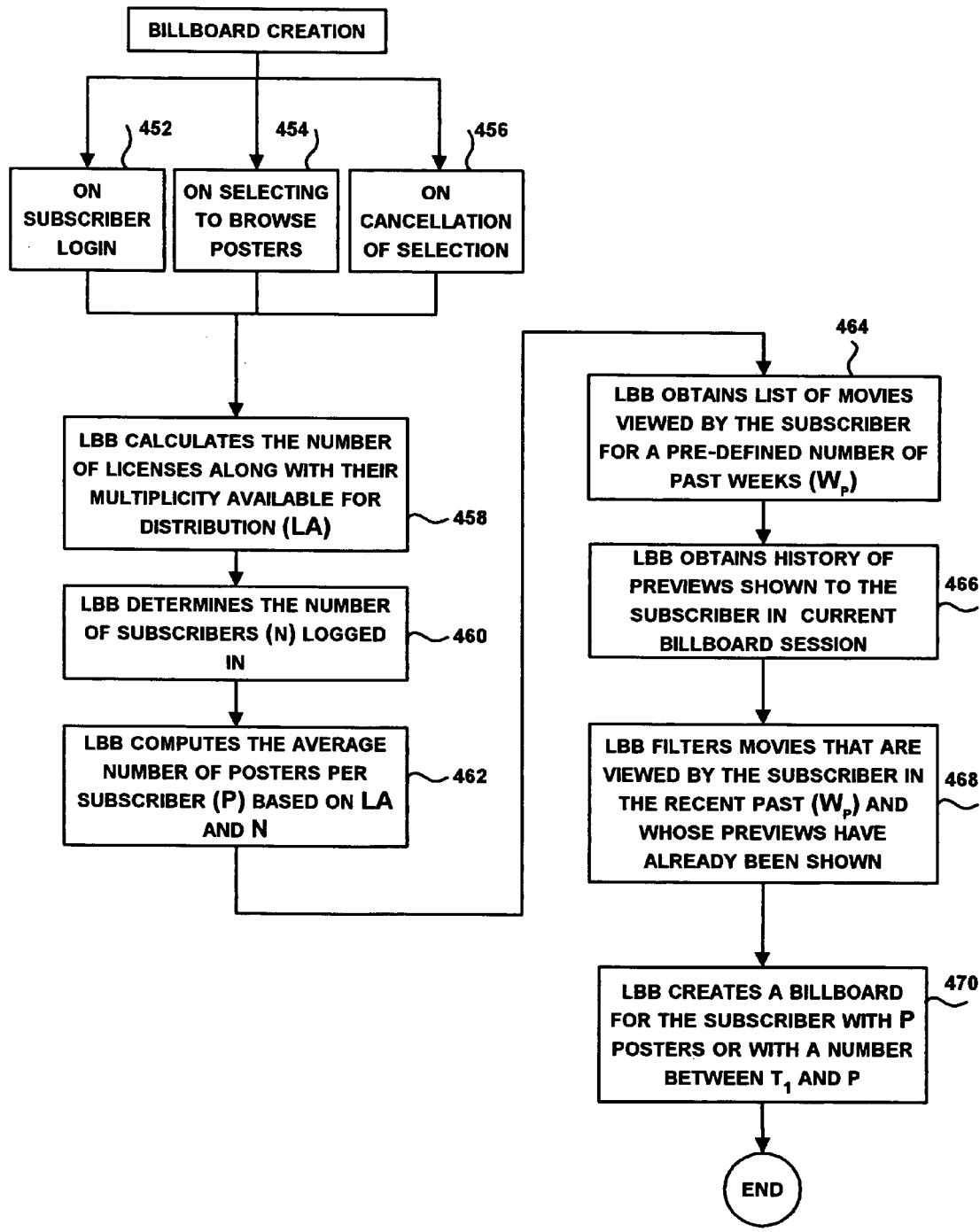
FIG. 4A: BILLBOARD CREATION

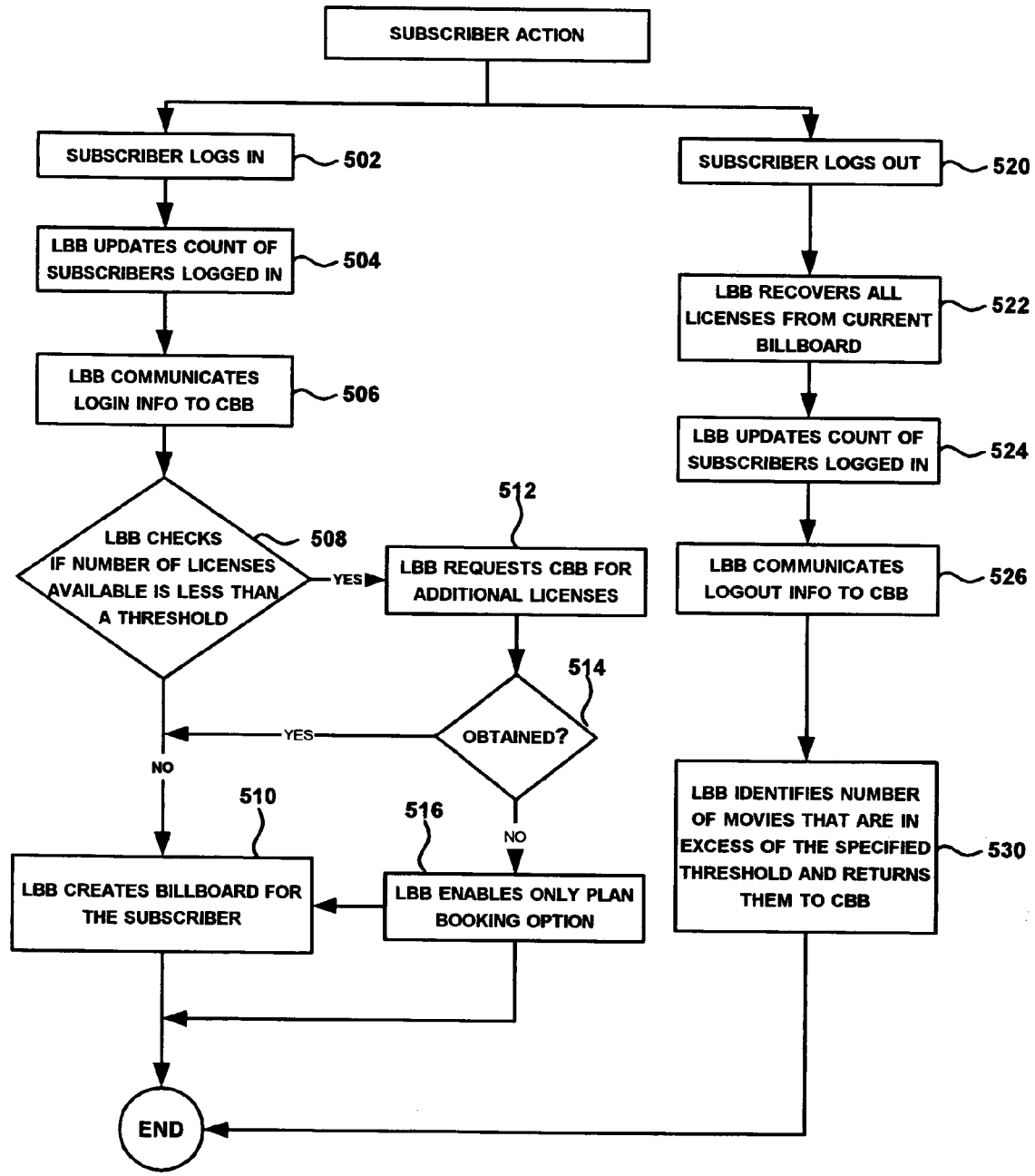
FIG. 5: LOGIN AND LOGOUT MANAGEMENT

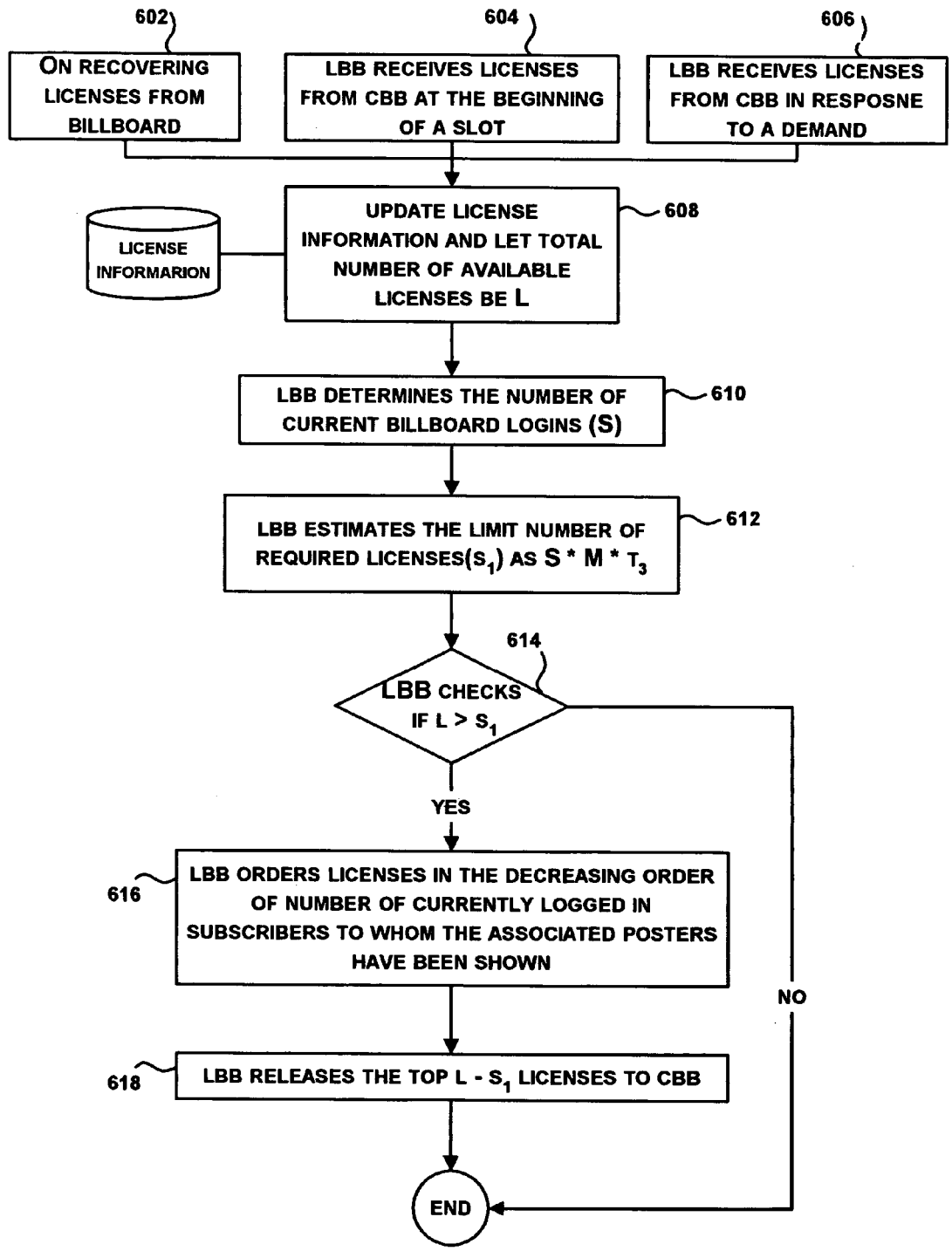
FIG. 6: LBB LICENSE MANAGEMENT

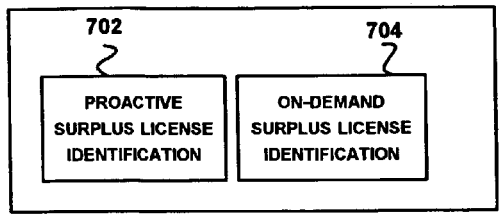
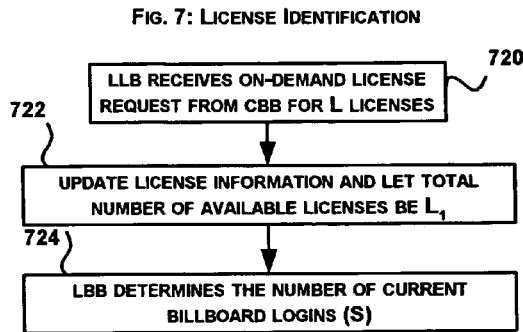
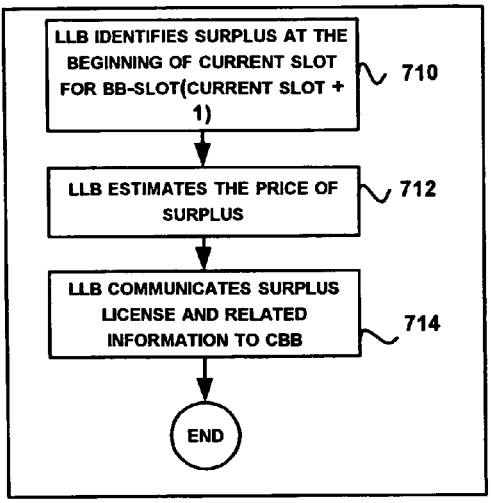
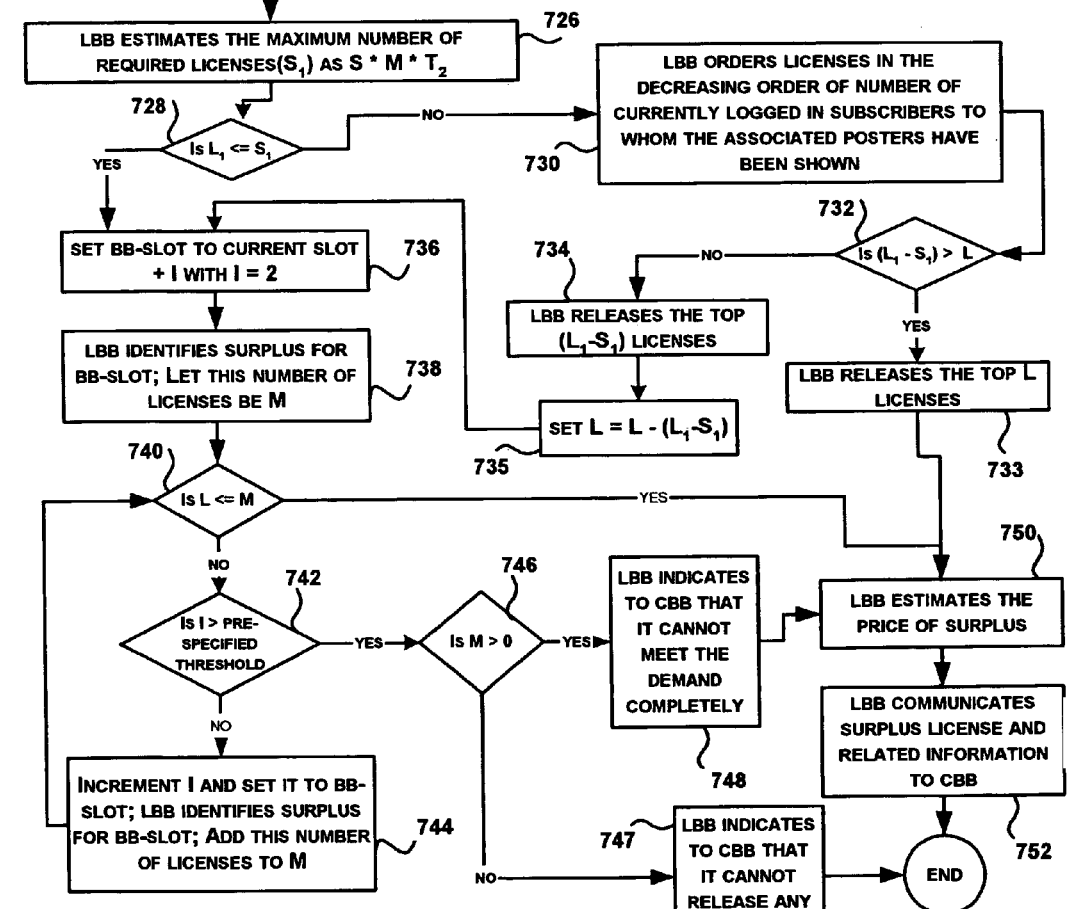
FIG. 7: LICENSE IDENTIFICATION
FIG. 7A: PROACTIVE LICENSE IDENTIFICATION
FIG. 7B: ON-DEMAND LICENSE IDENTIFICATION

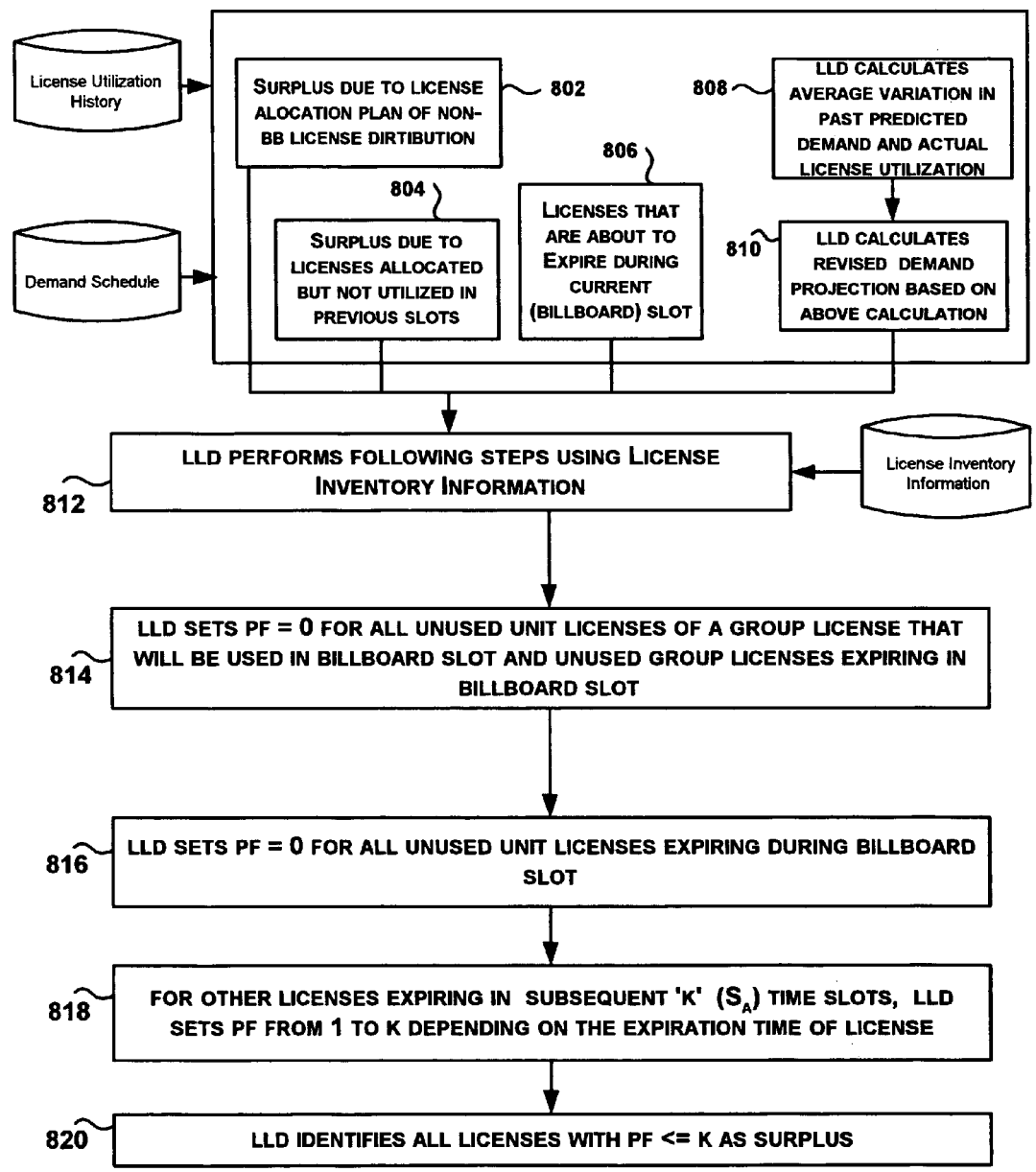
Fig. 8: Surplus Identification for a Given Slot

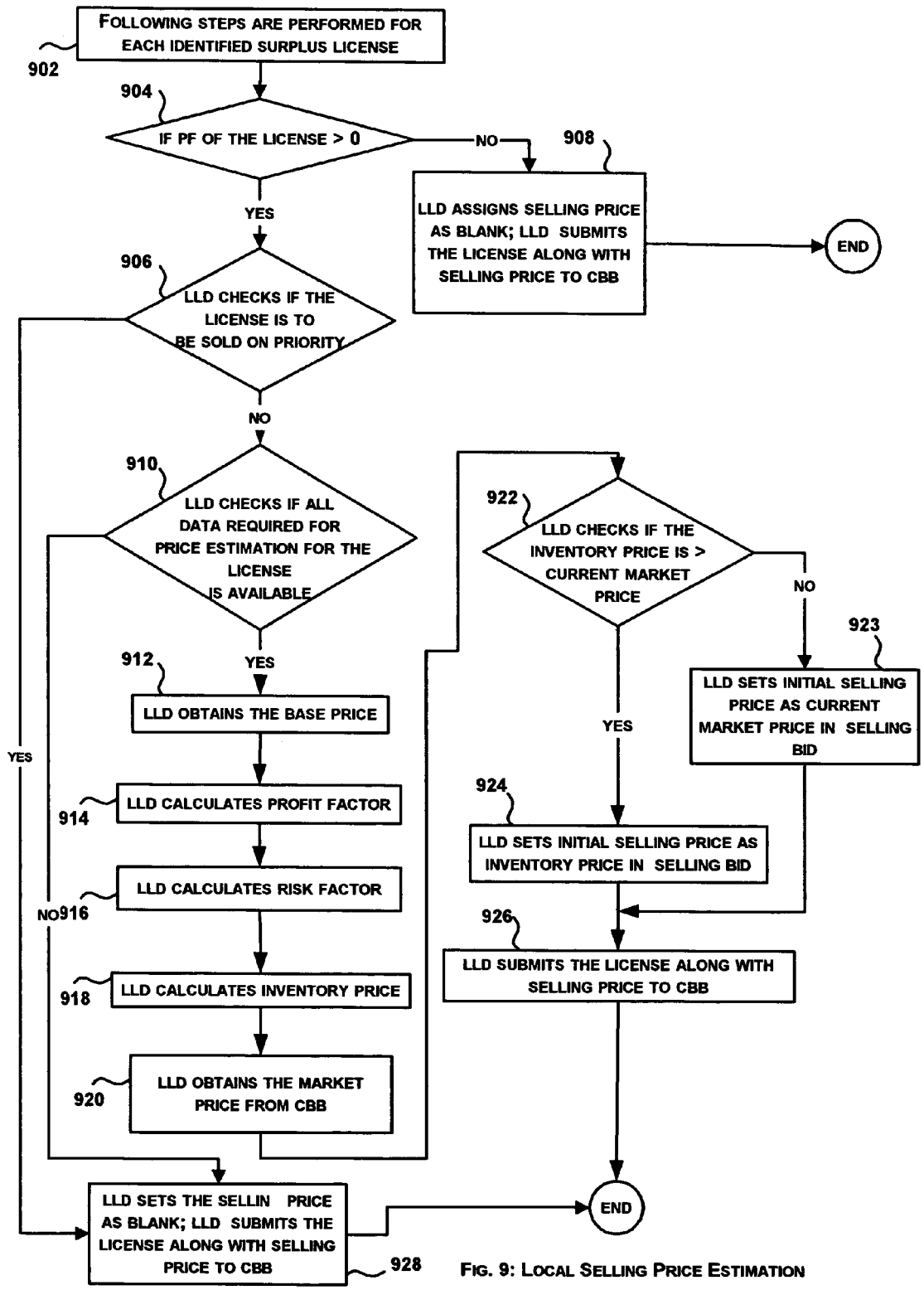
FIG. 9: LOCAL SELLING PRICE ESTIMATION

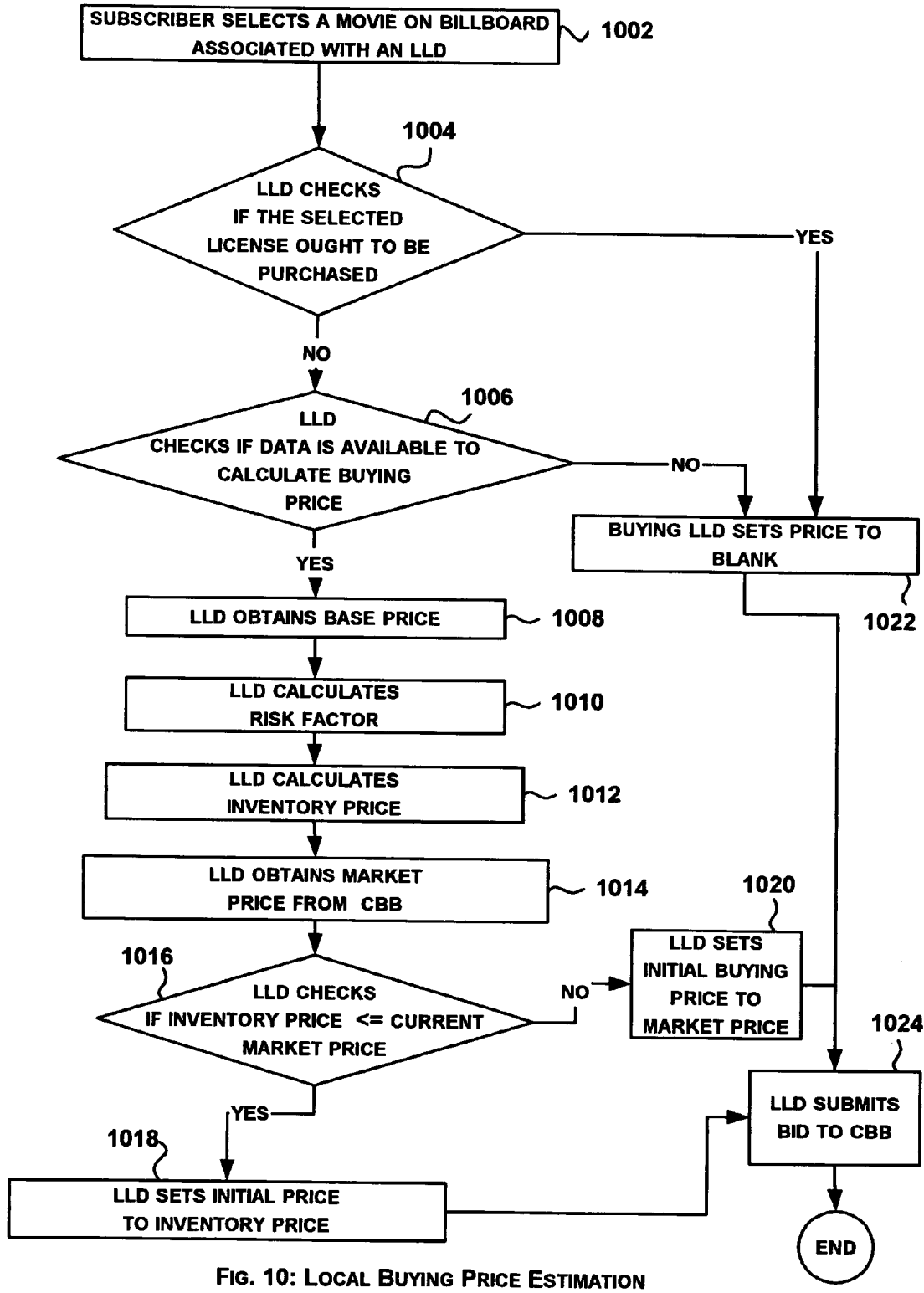
FIG. 10: LOCAL BUYING PRICE ESTIMATION

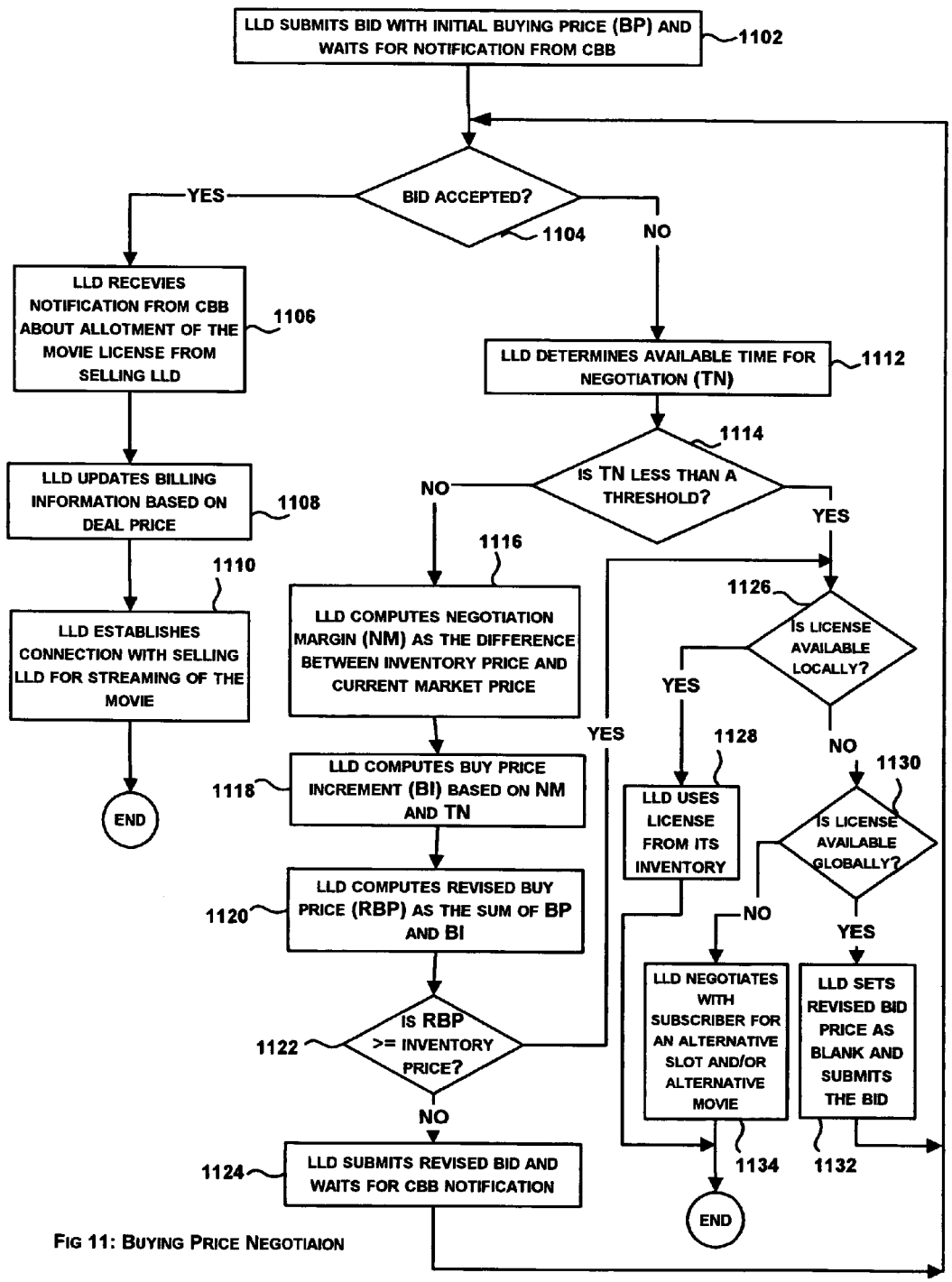
FIG 11: BUYING PRICE NEGOTIAION

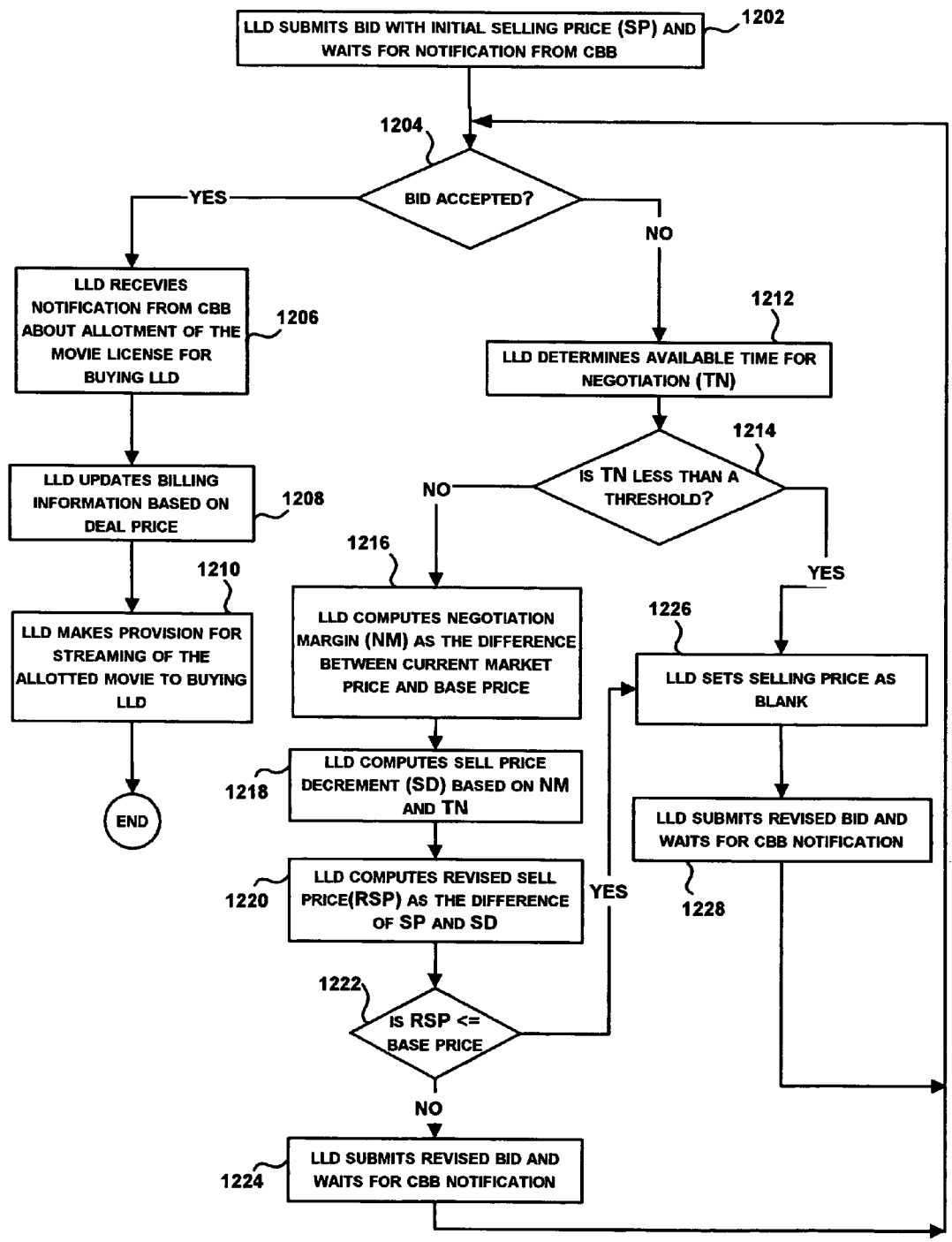
FIG. 12: SELLING PRICE NEGOTIAION

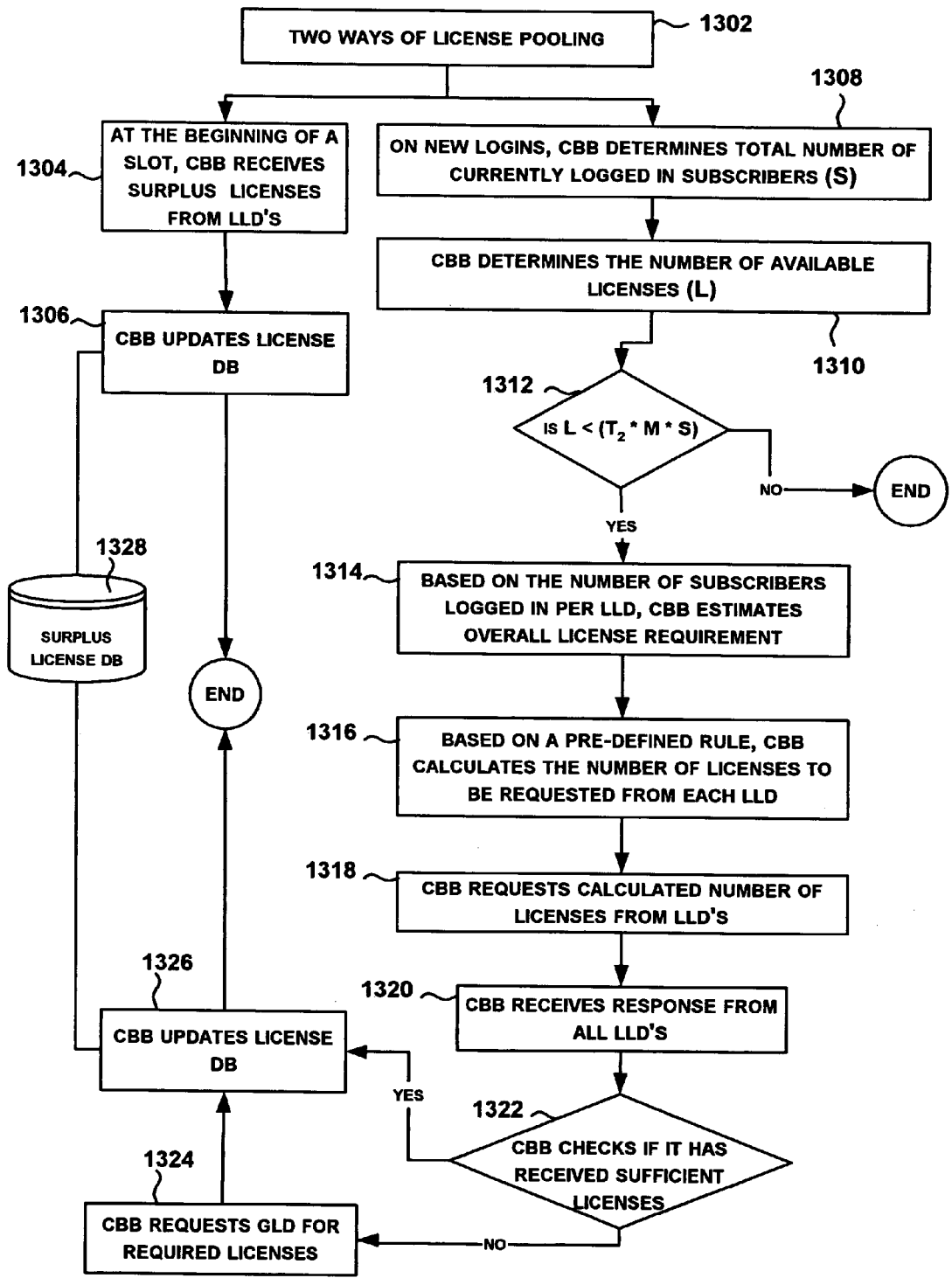
FIG. 13: LICENSE POOLING

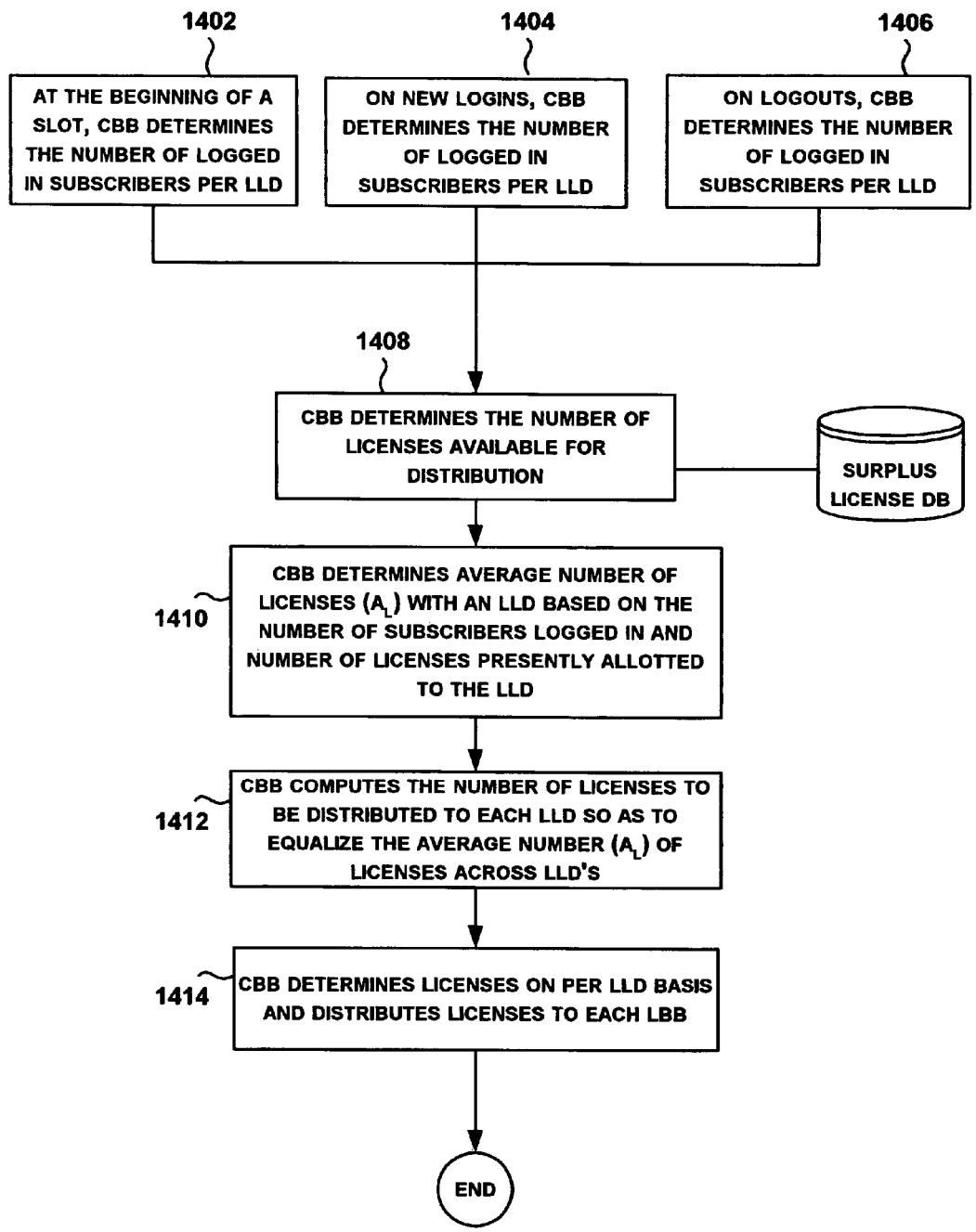
FIG. 14: LICENSE DISTRIBUTION

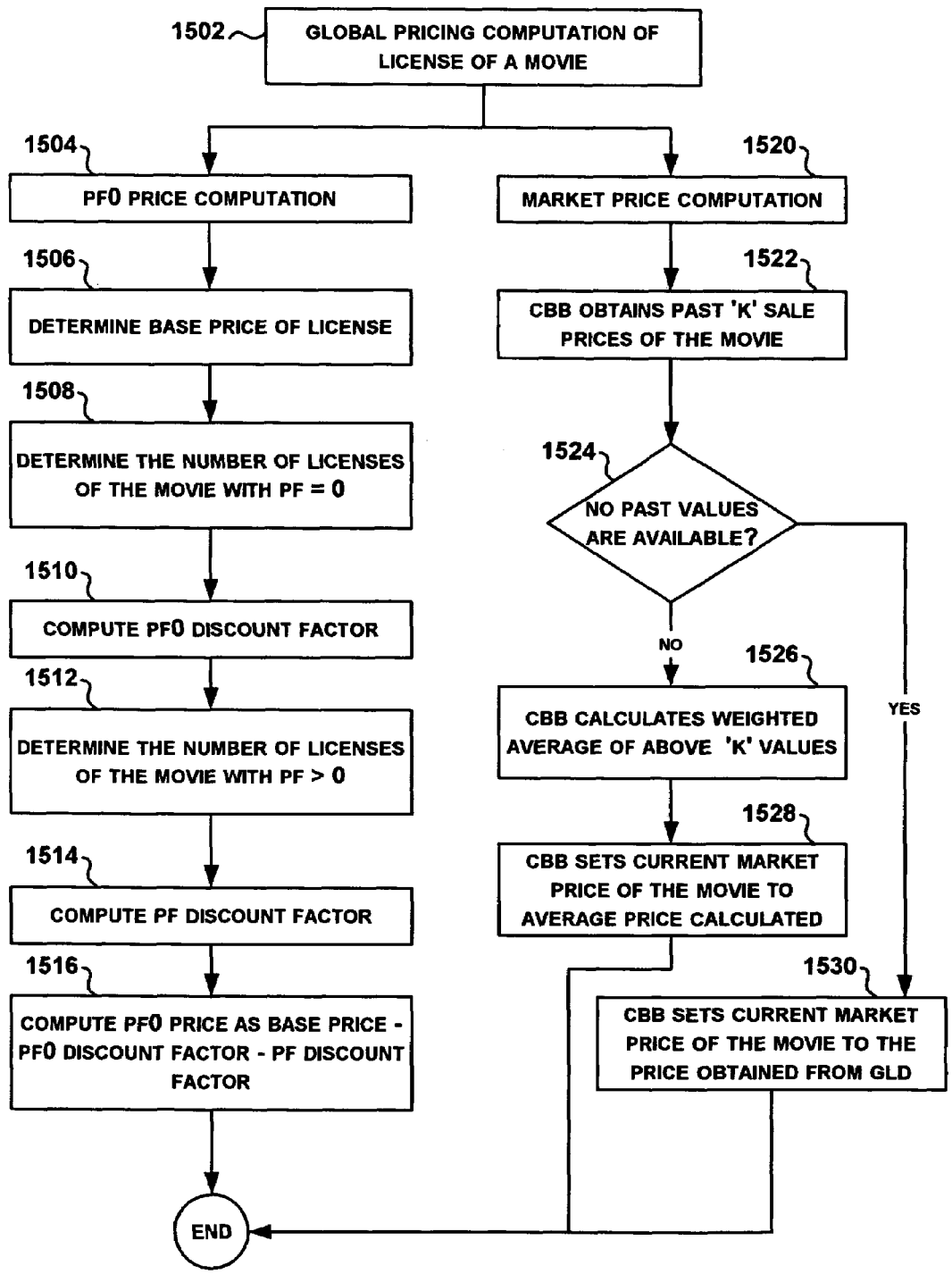
FIG. 15: GLOBAL PRICING OF A LICENSE

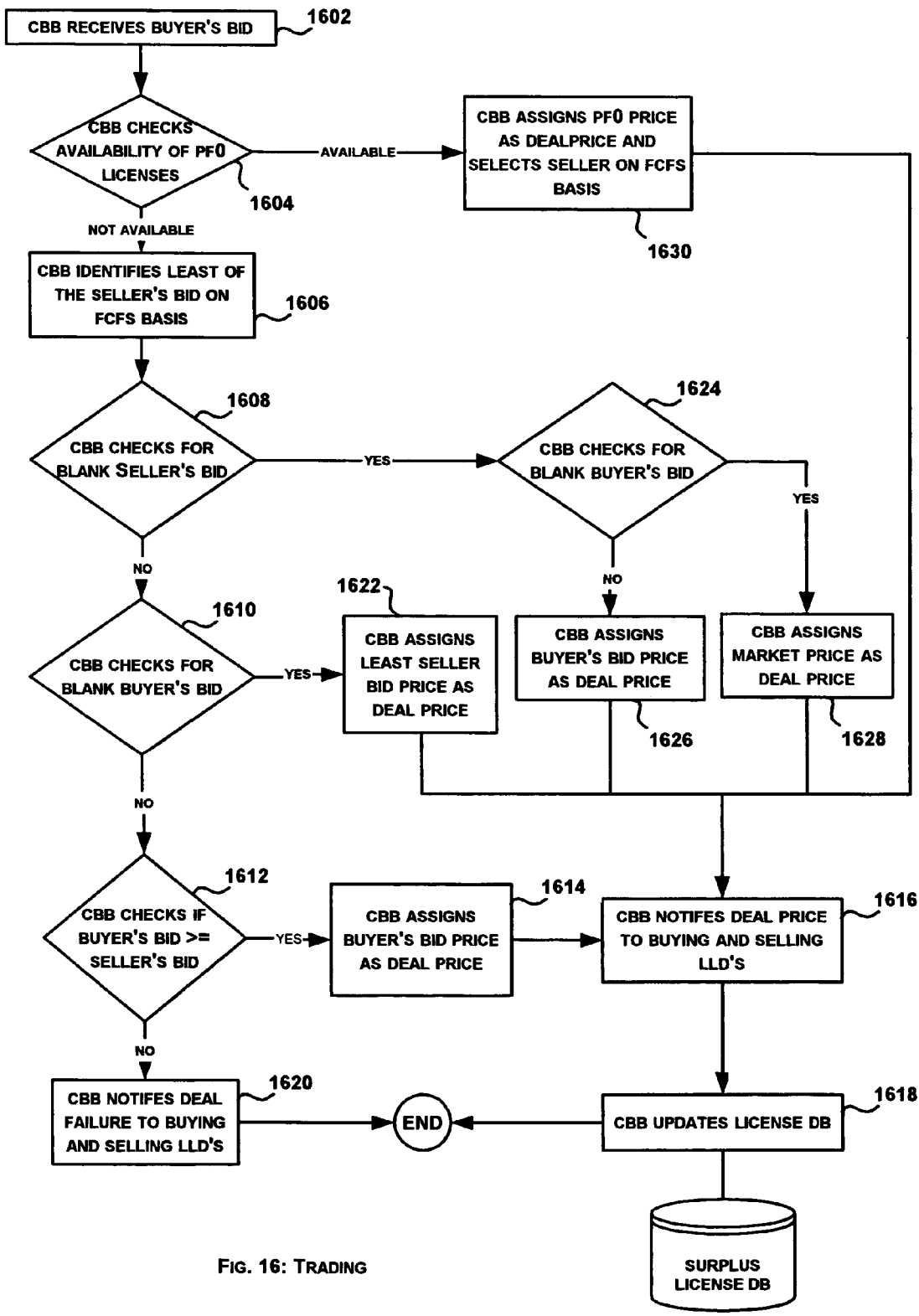
FIG. 16: TRADING

SYSTEM AND METHOD MAXIMIZING VIDEO LICENSE UTILIZATION USING BILLBOARD SERVICES

FIELD OF THE INVENTION

The present invention relates to video license distribution in general, and more particularly, maximizing video license utilization. Still more particularly, the present invention relates to a system and method for maximizing video license utilization by real-time centralized management of available licenses.

BACKGROUND OF THE INVENTION

The video distribution systems are ever growing in number and complexity. With this growth, in terms of the content generation and subscriber base, comes the challenge of balancing between satisfying the subscribers' demands and maximizing the utilization of the available video licenses. Consider a scenario where there are multiple branch operators that are part of a single video distribution system. These operators obtain licenses from the central license manager periodically and use the same to service their subscriber base. There are situations wherein a branch operator has licenses for a set of movies but demand from the subscriber base is for a different set of movies. In such situations, there is a threat to achieving subscriber satisfaction and maximization of license utilization. Analyzing such situations across multiple branch operators provides an opportunity to combine demands and license availability across these operators thereby attempting to reduce the mismatch between availability and demand. Specific situations such as this can be addressed by deploying a common platform for branch operators for exchanging licenses and demands among these operators to achieve a twin objective of enhancing subscriber satisfaction and maximizing license utilization. One of the ways to maximize the license utilization is to create an environment wherein the branch operators are allowed to trade licenses to maximize their return on investment. As the branch operators are part of a video distribution system, such license trading primarily enhances cooperation and, at the same time, encourages competition among the operators.

Combining demands from multiple branch operators needs to be done in real time to reduce the risk that a branch operator would face in not having adequate licenses to meet the demands from the branch operator's subscriber base. This means that the branch operator would be willing to identify and trade surplus licenses only after ensuring that there is no anticipated demand from the subscriber base. Such a just in time identification of surplus licenses requires a comprehensive system that provides necessary interfaces to generate and service online demands from subscribers across multiple branch operators. The concept of billboard is well suited for such purposes wherein a billboard consisting of information regarding the available movies is presented to subscribers of a branch operator. This provides an opportunity for subscribers to select movies of their choice and based on the selection, local billboard, that is part of branch operator infrastructure, on need basis interacts with central billboard, that is part of central operator infrastructure, to obtain the licenses through negotiation and trading.

DESCRIPTION OF RELATED ART

U.S. Ser. No. 10/285,511 filed on Nov. 1, 2002 in the name of Srividya; Gopalan, Kanchan; Sripathy, Sridhar; Varadarajan, and Kalyana Rao; Korrapati, titled "System and method for maximizing license utilization and minimizing churn rate based on zero-reject policy for video distribution" is hereby incorporated by reference.

U.S. Pat. No. 5,797,126 to Helbling; Edward and Glass; Andrew for "Automatic theater ticket concierge" (issued on Aug. 18, 1998) describes a system in which individual kiosks interact with a central station through wireless communication. Based on the information provided by the central station, the users of the kiosks can select events of their interest, view an excerpt, and if required can view the stage from different seating positions before making the decision.

U.S. Pat. No. 6,496,809 to Nakfoor; Brett for "Electronic ticketing system and method" (issued on Dec. 17, 2002) describes a method of electronically exchanging tickets for an event in a secondary market from ticket sellers to ticket buyers through remote terminals. This system facilitates the exchange of tickets between buyers and sellers by receiving and matching bids from them.

U.S. Pat. No. 6,424,998 to Hunter; Charles Eric for "System permitting the display of video or still image content on selected displays of an electronic display network according to customer dictates" (issued on Jul. 23, 2002 and assigned to World Theatre, Inc.) describes a system multiple electronic billboards or electronic displays that are networked with a central station. Through these displays, advertisers can display their advertisement. These electronic displays are located in highly populated places such as traffic junctions and advertisers can choose one or more specific billboards and display their contents that can be still images or video clips. In another application of this invention, digital movie theaters can obtain digital movies for display on high resolution electronic displays.

"A License Management Model to Support B2C and C2C Music Sharing" by S. H. Kwok and S. M. Lui (appeared in Tenth International World Wide Web Conference, May 2001) describes a model for license management to support B2C and C2C content sharing. The license management system consists of two types licenses, namely, official license and peer license, and the peer to peer sharing model encompasses superdistribution, transfer of ownership, and rental.

"Participation Incentive Mechanisms in Peer-to-Peer Subscription Systems" by S. M. Lui, Karl R. Lang, and S. H. Kwok (appeared in the Proceedings of the Thirty-fifth Hawaii International Conference on System Sciences (HIJCSS-35), January 2002) discusses the effects of incentives in peer-to-peer systems and propose the inclusion of the four features into P2P application environments, namely, (a) contribution-reward mechanism; (b) individual identity and profile generation; (c) sub-community building; and (d) peer recommendations, as the motivation for enhancing the co-operation between the peers.

The known systems do not address the issue of maximizing the utilization of the licenses in general and those licenses that are due for expiry in particular. The present invention provides with billboard for subscribers wherein the subscribers can choose to preview or select a movie of choice to generate demands for the available licenses. Further, the present invention provides for regulated and unregulated trading to handle effectively licenses that are about to expire. Also, the present invention proposes a cooperative approach to license utilization among different branch operators to achieve maximum license utilization.

SUMMARY OF THE INVENTION

The primary objective of the invention is to achieve maximization of video license utilization by using a billboard service for real time distribution of licenses to meet the demands from the subscribers across different Local License distributors (LLD). This is achieved by providing a mechanism for the exchange of surplus licenses among LLDs to maximize the overall utilization of licenses. This exchange of licenses is facilitated by encouraging profitable and cooperative trade between the LLDs that own the surplus licenses and the LLDs that have demand for these licenses.

One aspect of the present invention is the real-time management of licenses wherein a local billboard (LBB) manages the collection of licenses from the central billboard (CBB), the distribution of these licenses to the subscribers who have logged on to the billboard service, the need for additional licenses by requesting the CBB for additional licenses, and the returning of excess licenses to the CBB.

Another aspect of the present invention is the subscriber management wherein a local billboard manages the activities related to subscriber registration and service level agreements.

Yet another aspect of the present invention is the billboard management wherein a local billboard manages the creation of new billboards, the interactions of a subscriber with the billboard by providing appropriate responses to the subscriber's actions, and the released licenses due to the subscriber's logout.

Another aspect of the present invention is to provide a method for surplus license identification by an LLD wherein the surplus licenses are identified based on license allocation plan, license utilization history, license expiry information and the expected demand variation.

Yet another aspect of the present invention is to provide a method for estimating the buying and selling prices by an LLD for the traded licenses.

Another aspect of the present invention is to provide a method for negotiation by an LLD during the buying and selling of licenses.

Yet another aspect of the present invention is to provide a method for price estimation for the licenses that are about to expire and the estimation of current market price for the licenses by the CBB.

Another aspect of the present invention is to provide a method for license pooling wherein the CBB collects licenses from the various LLDs for trading purposes.

Yet another important aspect of the invention is the mechanism for trading of the licenses among the LLDs, facilitated by the CBB, based on an iterative auction in which the buying and selling LLDs arrive at a deal after one or more rounds price negotiation.

BRIEF DESCRIPTION OF THE DRAWINGS

FIG. 1 depicts the architecture of the Billboard Video License Utilization System.

FIG. 1A provides a brief description of the various databases of BBVLU system.

FIG. 1B provides an overall high level workflow of BBVLU system.

FIG. 2 is a network architecture depicting the interconnection among GLD and LLDs in a provider's network.

FIG. 3 depicts the procedures related to the subscription of a subscriber to the billboard service.

FIG. 4 depicts the procedures related to the billboard management.

FIG. 4A describes the procedure related to the billboard creation.

FIG. 5 describes the procedures related to login and logout management.

FIG. 6 describes the procedure related to the license management performed by LBB.

FIG. 7 depicts the surplus license identification procedures performed by LBB.

FIG. 7A describes the proactive surplus license identification procedure.

FIG. 7B describes the on demand surplus license identification procedure.

FIG. 8 describes the procedure related to the identification of surplus licenses for a given slot.

FIG. 9 describes the procedure related to the estimation of selling price of a license by LLD.

FIG. 10 describes the procedure related to the estimation of buying price of a license by LLD.

FIG. 11 describes the procedure related to the negotiation of license buying price by LLD.

FIG. 12 describes the procedure related to the negotiation of license selling price by LLD.

FIG. 13 depicts the procedure related to the collection of licenses by CBB from various LLDs.

FIG. 14 describes the procedure related to the distribution of licenses by CBB to the various of LLDs.

FIG. 15 describes the procedures related to the pricing of a license performed by CBB.

FIG. 16 describe the procedure related to the trading of licenses managed by CBB.

DETAILED DESCRIPTION OF THE PREFERRED EMBODIMENTS

FIG. 1 depicts the system architecture of Billboard Based Video License Utilization System (BBVLU) consisting of multiple Local License Distributors (LLD) and a Global License Distributor (GLD). The main objectives of BBVLU are to provide billboard based services to the subscribers for real time selection of movies made available by different LLDs, to achieve efficient overall utilization of licenses available with different LLDs by distributing the licenses to subscribers across different LLDs, to get a fair price for the surplus licenses traded by the LLDs, and to retain subscriber loyalty to the billboard services by providing any movie selected by the subscriber from those shown on Billboard on best effort basis. Some of the BB services (102) include Current Booking, Advance Booking, and Plan Booking.

Billboard guaranties a subscriber to provide with a billboard view whenever the subscriber logs on to the billboard service. Each billboard view consists of a pre-determined number of movie posters with the relevant information related to the movies. Billboard provides the subscriber with an option to request for a preview of any movie shown on the billboard or select a movie for viewing. The subscriber may also choose to view a new set of posters by clicking on "Browse Posters" button.

Each LLD is associated with a Local billboard subsystem (LBB) (104), which directly interacts with billboard subscribers and with the central billboard. LBB creates customized billboards for each subscriber who has logged on to the billboard service based on the past viewing history of the subscriber. The past viewing data that is logged is based on specific permissions granted by the subscriber and further, the use of past viewing history to customize the billboard is also based on the permissions granted by the subscriber. The process of customization uses the viewing history to select movies for the billboard views such that the subscriber is not shown any of the movies, which the subscriber has already viewed. Further, a movie poster shown during a billboard session is not repeated in the same session, thereby enhancing the subscriber's interest in the billboard service.

LBB manages the movie distribution to different billboards of subscribers in response to the fresh logins and logouts. LBB also manages the licenses being released by different billboards as a result of time expiry of billboard views. LBB manages the subscribers who are currently logged on to the system by providing appropriate responses to their actions such as preview requests, movie selections, or cancellation of selected movies. LBB performs the license management to suit the consequences arising out of the subscriber actions. One of the aspects of the license management is to ensure that the licenses are available when the subscriber selects a movie from the billboard. In order to achieve this, the licenses related to the posters of a billboard are held bound to this subscriber and released either based on explicit subscriber actions such as "Browse Posters" or log out. Also, when the subscriber chooses to preview a movie, the licenses related to the other posters of the billboard are released so as to optimally utilize the available licenses.

Central billboard (CBB) (106) facilitates the collection of surplus licenses from different LLDs and distribution of them to LBBs for providing them to the billboard subscribers. The objective of CBB is to achieve efficient utilization of licenses available with different LLDs by addressing the real time demands generated by the billboard service across different LLDs. CBB provides a platform for trading of surplus licenses between the LLDs. Each of the surplus licenses is assigned a factor signifying the time left before the license expires. To minimize the non-utilization of licenses, the licenses with immediate expiry are required to be distributed on priority, and such licenses are traded between LLDs through regulated trading in which the CBB regulates the prices of the licenses. Rest of the licenses that have no immediate license expiry are traded between LLDs as part of unregulated trading in which the final prices are decided by demand-supply situation prevailing at that time. CBB conducts the unregulated trading between the LLDs.

CBB uses the price history database to estimate current market price that is used to regulate the license price for regulated trading. CBB also does the collection of licenses from the LLDs for serving the demands arising from the fresh logins. Even after the on-demand collection of licenses, if the requirement for licenses is not completely fulfilled, then CBB requests additional licenses from the GLD.

In order to ensure a continuous activity to maximize license utilization, CBB periodically requests LLDs to provide such licenses that can be traded across multiple LLDs to achieve better distribution. The periodicity, also called as "slot," is a configurable parameter and indicates the following: at the beginning of every slot, CBB requests for licenses from LLDs to be distributed to LLDs to trade as part of the Billboard services in the next immediate slot; slot duration also indicates the maximum time within which the streaming of movies, related to current booking requests through billboard, are initiated; further, at the beginning of every slot, LLDs receive additional licenses from CBB and use the same to achieve better distribution of movies to billboards.

License assessment subsystem (LAS)(108) is a part of every LLD and manages the trading related functions of individual LLDs. Every LLD participates in the trading of licenses either in the role of a buyer, seller or as both, and depending on these roles, LAS performs appropriate trade related functions for the LLD.

LAS identifies the surplus of licenses and the identification is based on the assessment of the current license allocation plan for the confirmed demand, the forecasted license demand, and assessment of the available licenses and their expiry information. The license allocation plan and forecasting are related to meet the demand for licenses arising due to non-billboard distribution services. Further to the identification of the surplus, LAS assigns perishability factors to each of these licenses, based on "time to expire" of licenses and the current license utilization plan, to enable an efficient of utilization of available licenses.

In both buyer and seller roles, the LLDs are required to quote a price for the licenses they wish to trade. LAS estimates the price for each of the licenses. Price estimation is based on several factors such as the base price at which the LLD acquired the license from GLD, the perishability factor, and the risk associated with selling and repurchasing of the licenses. This estimated price is quoted as the starting price for trade negotiation between buying and selling LLDs. LAS facilitates price negotiation between buying and selling LLDs via CBB to close the deal to the satisfaction of buyers and sellers.

FIG. 1a provides a brief description of a few important elements of BBVLU databases. 120 represents subscriber information related database and consists of information such as percentage of free movies that can be viewed through Billboard and time restrictions on the usage of Billboard. Note that these two elements are a part of subscriber-specific SLA. 122 represents login information related database and consists of information such as number of posters in the current billboard and cumulative provisioning delay. The first element is used to either increase or decrease the number of posters in a billboard based on the number of available licenses. The second element is used ensure fairness when there is a shortage of licenses. 124 represents license information related database and consists of number of licenses with PF being 0 and PF not being 0 obtained from several LLDs for different movies. 126 represents movie viewing information related database and consists of information such as date and time of a movie viewed by a subscriber along with whether billboard was used to request for the movie. 128 represents price information related database and consists of details of every deal in terms of the type of license and the deal price. 130 represents demand schedule information related database and consists of information such as the availability of licenses in various slots taking into account confirmed and expected demands. The availability of licenses takes into account two different kinds of licenses, namely, group and unit licenses where a group license is a packaging of n unsplittable unit licenses. 132 represents configuration database and consists of information related to various configurable parameters.

FIG. 1b describes typical workflows related to BBVLU system. 140 describes a typical subscriber-related workflow providing registration and Billboard interaction scenarios. 142 describes a typical LBB-related workflow involving buying and selling of licenses. 144 describes a typical CBB-related workflow facilitating trading of licenses.

FIG. 2 describes overall network architecture of the BBVLU system consisting of multiple branch operators and one central operator. The system comprises of multiple subscribers connected to Local license distributor (LLD) (202) through a local network and such multiple LLDs are connected to a Global license distributor (GLD) (204) through a global network. An LLD, using LBB and LAS, manages the billboard display to subscribers who are part of the same local network and manages the database that is used to compute surplus licenses to be traded during each slot, buying/selling of licenses to meet near video on demand requests, and to construct subscriber-specific most preferred billboards. GLD, using CBB and PLD, interacts with LLDs who are part of the same global network to obtain licenses for trading purposes and manages the database to facilitate trading of obtained licenses.

FIG. 3 describes the procedure for billboard subscription which consists of three distinct tasks, one, a subscriber's registration for billboard services, two, SLA modification which can be done by a subscriber at any time, and three, unregistration of a subscriber when the subscriber desires not to avail billboard services.

Subscriber's registration consists of determining the type of subscription desired by the subscriber (302) followed by obtaining the response of the subscriber on the percentage of free movies that can be viewed using Billboard (304) and this is dependent on the type of subscription. As part of the registration, the subscriber can negotiate with the operator regarding the possible time slots for Billboard access (306). The total time allowed for a subscriber per day and the time slots for Billboard access depends on the SLA type of the subscription. On completion of the registration procedure, the subscriber database and the SLA database are updated (308).

As part of the SLA modification, the subscriber can modify the percentage of the free movies the subscriber can view through the billboard (314) and modify the options on billboard access time (316) after a negotiation with the operator. The modifications are updated onto the SLA database (318).

When the subscriber unsubscribes the Billboard services, the same is updated onto the subscriber database (320).

FIG. 4 describes Billboard management related to subscriber interactions. Step 402 is a procedure for handling subscriber action on "Browse Posters." In step 404, LBB recovers the licenses related to the currently displayed billboard and in step 406, a new billboard is created and displayed. This billboard creation involves the selection of subscriber-specific posters and the number of posters depend on the availability of licenses with LBB at that point of time.

Step 408 is related to the action taken by the system if there is prolonged subscriber inactivity. The system waits for a pre-specified idle time (410) before recovering the licenses (404) and initiating the creation of new billboard (406).

Step 412 is related to the action taken by the system when a subscriber chooses to preview a poster. In step 414, LBB recovers the licenses of the movies related to the poster other than the selected poster for redistribution purposes. A preview associated with a poster consists of multiple preview clips and based on the subscriber prior previewing sessions, a most appropriate preview clip is selected (416). LLD initiates the streaming of the selected preview (418) and waits for further actions of the subscriber (420). If subscriber chooses "Browse Posters," the system creates and displays a new billboard (406). On selecting to view a movie, step 422 checks whether the subscriber intends to view the movie right away (current booking) or would like to make an advance booking. In case of advance booking, LLD checks the availability of license for the requested date and time (424 and 426) and if available, LLD notifies the confirmation of the booking and updates the license and schedule related databases (428). If the license is not available, LLD negotiates with the subscriber for an alternative movie/slot (430). On the other hand, in case of current booking, LLD initiates buying negotiation for obtaining the license from CBB for the selected movie (432). If license cannot be obtained, step 430 is performed. If license is obtained from CBB, LLD generates relevant billing information to the selling LLD (436), updates license information database with the current transaction details (438), and schedules the streaming of the movie at the next immediate slot (440).

Step 442 is related to the action taken by the system when a subscriber chooses to view a movie. In step 444, LBB recovers the licenses of the movies related to the billboard other than the selected poster for redistribution purposes and performs from step 422 onwards. During the course of interaction, if a subscriber chooses to cancel a previously made selection (446), LLD, if necessary, initiates the procedure for the cancellation of billing transaction (448) and creates and displays a new billboard (449).

FIG. 4a describes steps involved in the creation of a billboard. In step 452, LBB receives a new login request requiring the creation of billboard. In step 454, LBB needs to create a billboard in response to subscriber's action of selecting to browse posters. Similarly, in step 456, LBB creates a billboard when subscriber cancels a selection made to view a movie. In step 458, LBB calculates the number of licenses along with their multiplicity (LA) and the determination of multiplicity is essential as a subscriber is not shown the same poster of a movie in the same session. In step 460, LBB determines the number of current number of subscribers who logged into the Billboard service (N). This step is performed in order to ensure that each subscriber is shown a number of poster that is in between $T_1$, and $T_2$ parameters. In step 462, LBB computes the average number (P) of posters per subscriber based on LA and N. Steps 464-468 are performed to ensure that the poster of a recently watched movie by a subscriber is not shown as part of the billboard being created. In step 464, LBB obtains the list of movies viewed by the subscriber for a predefined number of past weeks ($W_p$) and in step 466, LBB obtains information related to previews already shown to the subscriber in the current billboard session. In step 468, LBB filters movies are viewed by the subscriber in the recent past ($W_p$) and the previews that have already been shown from the available list of licenses. Finally, in step 470, LBB creates a billboard for the subscriber either with P posters or with a number that is between $T_1$, and P.

FIG. 5 describes the login/logout management. When a subscriber logs into the system (502), LBB updates the count of subscribers logged in (504) and this information is communicated to CBB (506). In step 508, LBB checks if the number of available licenses is less that $T_2$*M*(number of currently logged in subscribers) where M is the multiplication factor. If adequate licenses are available, LBB creates a billboard and displays the same (510). On the other hand, if adequate number of licenses are not available, LBB requests CBB for additional licenses (512). If obtained (512), LBB proceeds to step 510, else LBB enables only PLAN BOOKING option (516). Whenever a subscriber logs out (520), LBB recovers all the licenses allotted to the current billboard (522). In step 524, LBB updates the count of number of subscribers logged in and in step 526, this information is communicated to CBB. In step 530, LBB identifies the movies that are in excess of $T_3$*M*(number of subscribers currently logged in) and returns them to CBB.

FIG. 6 describes the license management performed by LBB. On recovering licenses from a billboard due to the events such as logout (602), on receiving licenses from CBB at the beginning of a slot (604), or on receiving licenses from CBB in response to a demand (606), LBB updates License Information database (608). Let the total number of available licenses be L. In step 610, LBB determines the current number of logged in subscribers (S) and in step 612, LBB estimates the limit number of required licenses ($S_1$) as $S*M*T_3$ where M is the multiplicity factor and $T_3$ is the limit number of posters per billboard. If $L>S_1$ (614), then this indicates that there are excess number of licenses and hence, LBB releases these excess licenses to CBB. LBB orders licenses in the decreasing order of number of currently logged in subscribers to whom the associated posters have been shown (616) and in step 618, LBB releases the top $L-S_1$ licenses to CBB.

FIG. 7 describes two distinct ways of identifying licenses for trading purposes. In step 702, LBB analyses and identifies the surplus licenses periodically at the beginning of each slot and in step 704, LBB identifies surplus licenses in response to a demand for licenses from CBB.

FIG. 7a describes proactive license identification by LBB. In step 710, LBB identifies surplus licenses at the beginning of Billboard slot that is the next immediate slot and in step 712, LBB estimates the price for each of these licenses. Finally, in step 714, LBB communicates surplus licenses and their related information to CBB.

FIG. 7b describes the steps involved in on-demand surplus license identification by LBB. On receiving request for L licenses from CBB (720), in step 722, LBB updates license information and determines the number of available licenses ($L_1$). In step 724, LBB determines the number of subscribers currently logged in (S) and in step 726, LBB estimates the maximum number of required licenses as $S_1=S*M*T_2$ where M is the multiplicity factor and $T_2$ is the maximum number of posters per billboard. If the number of available licenses (L1) is greater than the required number of minimum licenses (S1) (728), then in step 730, LBB orders the available licenses in the decreasing order of number of currently logged in subscribers to whom the associated posters have already been shown. If the number of excess licenses is greater than the required number of licenses (L) to be made available to CBB (732), then in step 733, LBB releases top L licenses and execution proceeds to step 750. On other hand, if only some portion of L can be made available, then in step 734, LBB releases this excess portion (L1–S1). In step 735, L is set to the remaining number of licenses that need to be released to meet the demand from CBB (L←L–(L1–S1)) and execution to proceeds step 736.

On the other hand, in step 728, if it is determined that the number of available licenses is less than or equal to the required minimum number of licenses, then in steps 736 through 752, LBB computes the surplus beyond what it would have computed at the beginning of the current slot. In step 736, the surplus computation begins from next immediate slot, namely, BB-Slot. In step 738, LBB identifies surplus for BB-Slot, and let this number be M. If the required number of licenses (L) is greater than M (740), then a check is made to ensure that the number of iterations so far doesn't exceed a pre-specified threshold (742). In step 744, surplus is identified for the next subsequent slot and total surplus is accumulated in M. In step 746, under the condition that the pre-specified number of iterations are completed, if M is zero, then LBB indicates to CBB that it cannot release any license (747). If, on the other hand, M>, then LBB indicates to CBB it cannot meet the demand completely and in step 750, LBB estimates the price of the surplus licenses. Finally, in step 752, LBB communicates the surplus license and the related information to CBB. If in step 740, if the number of licenses required is less than the surplus, CBB performs steps 750 and 752 to price and release the demanded number of licenses.

FIG. 8 describes the procedure involved in the surplus license identification for a given slot. GLD distributes licenses to multiple LLDs and each of these LLDs uses the licenses to meet the subscriber demands. GLD does two kinds of license distribution: distribution to meet demand due to billboard services; distribution to address non-billboard services. Non-billboard services provide subscribers an opportunity to plan their movie viewing needs and LLD appropriately plans and obtains licenses from GLD. The billboard service is offered to subscribers as an additional service through which the subscriber can place near video on demand requests. The procedure described in FIG. 8 makes use of license-related planned (including both confirmed and expected) and utilization information, and derived license inventory information that contains consolidated license allocation information and information such as expiry date. One of the objectives of surplus identification procedure is to identify all the unallocated licenses that shall, if unused, expire in the next k slots. Billboard system is used for trading these surplus licenses amongst LLDs based on the demands from the subscribers who are the users of the Billboard system.

In step 802, surplus licenses are identified based on the nature of license allocation information. In this step, group licenses that have been committed to particular slots but are partially being used are identified and the unused licenses of group licenses are marked as surplus. Specifically, if a group license has been marked to be used in the current slot and the confirmed requests account for about 60% of the number of licenses, then it is appropriate to identify the remaining licenses as surplus to enhance the utilization of the available licenses. Note that "current slot" mentioned above is the slot in which near video on demand requests from the subscribers through Billboard system are streamed and is, typically, the next immediate slot. In step 804, licenses that are allocated but not used during the previous slots are marked as surplus. In this step, the past allocation plan is analyzed based on the up-to-the-minute requests to identify those requests that were expected but were not received. These licenses are used to meet the online demand requests from the subscribers through Billboard system. In step 806, licenses that are about to expire in the next immediate slot, also called as Billboard slot, are identified as surplus. In step 808, LLD calculates the average variation in the past predicted demand and actual license utilization and in step 810, LLD calculates the revised demand projection based on the above calculation. The excess, if any, arising due to over planning and the revised projection are marked as surplus.

GLD distributes licenses to each of the LLDs. Let $\{n_1, n_2, \ldots, n_l\}$, where $n_i$ denotes licenses of $i^{th}$ movie, be the licenses allotted to an LLD for a particular slot. Based on the demand for the slot and possible future demands, GLD distributes adequate number of group and unit licenses to each LLD. Each LLD maintains a demand schedule table that contains the slot-wise, inclusive of both confirmed and predicted, demands. Let $\{d_1, d_2, \ldots, d_k\}$, where $d_i$ denotes the predicted and confirmed demands for $i^{th}$ slot, be the licenses predicted for usage in k slots. LLD also maintains license utilization table that contains slot-wise actual license usage data. Let $\{a_1, a_2, \ldots, a_k\}$, where $a_i$ denotes the licenses that were used in $i^{th}$ slot, be the actual license usage for k slots. The difference between actual usage and demand schedule gives the deviation from prediction. In step 508, this deviation from prediction is calculated. Let $\{\delta_1, \delta_2, \ldots, \delta_k\}$, where $\delta_i=d_i-a_i$, be the deviation from the prediction for k slots. Let $\Delta$ be the average deviation from the prediction for k slots. In step 810, the revised demand schedule table based on $\Delta$ correction is constructed. By using the revised demand schedule table and the license inventory information, a license allocation plan is derived and is used to compute possible surplus licenses.

In step 812, LLD uses the license inventory information (that indicates the latest status on the availability of licenses) to identify and consolidate the surplus licenses in steps 814 through 820.

LAS assigns perishablility factor (PF) for each unused license depending on license expiration information. A license with PF of 0 means that the license, unless used, will expire in the Billboard slot and a license with PF of 1 will expire unless used in the billboard or the next immediate time slot. In the case of usage of a group license of a movie in a slot, all the unused unit licenses will expire if sufficient demand in that slot for that movie doesn't exist. In step 814, all the unused unit licenses of a group license slotted for the billboard slot are assigned PF of 0. In step 816, all the unit licenses that are expiring in the billboard slot are assigned PF of 0. In step 818, all the other licenses expiring in the subsequent k ($S_A$) time slots are assigned PF from 1 to k depending on expiration time of the licenses. Considering a license as surplus and submitting the surplus license to billboard means the LLD decides to utilize that license through billboard system. k is a configurable parameter and denotes that the LLD identifies the license the number of time slots before the expiry of the license as surplus and to be utilized through billboard system. In step 822, all the licenses with PF less than or equal to k are considered as surplus.

FIG. 9 describes the steps involved in pricing the identified surplus licenses. Completion of surplus identification triggers a sequence of steps for price estimation (902). As first step, the PF value of the license is checked (904) and if it is zero, then instead of estimating the price, LLD sets selling price as blank and the license along with price is submitted to CBB (908). In step 904, if PF value of the license is non-zero, then LLD checks if the license is to be sold on priority for reasons such as an expected fall in demand in the near future (906). In case the LLD chooses to sell the license on priority, then it sets the selling price as blank indicating that it is ready to sell the license at the best possible price and in this case, the market demand will decide the price of the license and the license along with price is communicated to CBB (928). If no such priority exists, then LLD further checks if the necessary data required for price estimation of the license is available (910) and if the data is not available, LLD sets the selling price as blank (928). If sufficient data is available, LLD proceeds with further steps in estimating the selling price for the license. LLD obtains the base price, the price at which the LLD procured the license from GLD (912). LLD then calculates the profit factor for the license (914) which is based on the PF of the license. A license with higher PF means that it doesn't expire too soon and hence, there is more opportunity for trading. As a consequence, the profit factors can be high indicating that the selling LLD is not desperate to sell the license. For similar reasoning, the licenses with lower PF value will tend to have lower profit margins. LLD calculates the risk factor associated with selling of the license (916). This risk is in terms of selling the license at a price and being required to buy a license for the same movie at a later time at a higher price. This calculation is based on the predicted demand for this license in the next few slots and the average deviation of the prediction from the actual usages in the past. Let $\{\delta_1, \delta_2, \ldots, \delta_k\}$, where $\delta_i = d_i - a_i$, be the deviation from the prediction for k slots. Let $\Delta$ be the average deviation from prediction for k slots. Risk factor is calculated as an inverse proportion of the calculated deviation: Risk factor $(R_f) = C/\delta_i$ where C is a configurable parameter specific to an LLD. As a next step (918), LLD calculates the inventory price as the sum of the base price and a price based on the above factors. LLD obtains the current market price for the license (920) and further compares the computed inventory price with the current market price (922). If the computed inventory price is greater than the current market price, the inventory price is set as the initial selling price (924) and LLD submits the license along with price to CBB (926). On the other hand, in step 922, if the computed inventory price is less than or equal to the current market price, then LLD sets the selling price as market price (923) and the license is submitted to CBB (926).

FIG. 10 describes the steps involved in pricing a license of the movie selected by a subscriber using Billboard. In step 1002, subscriber selects a movie for viewing for which the LLD has to negotiate with CBB for the purchase of the same. In step 1004, LLD checks if a license ought to be purchased based on factors such as SLA type of the subscriber and unavailability of licenses. If so, LLD sets the buying price as blank (1022) and submits the bid to CBB (1024). In step 1006, LLD checks and determines if sufficient data is available for calculating the buying price. If sufficient data is not available, then LLD sets the buying price as blank (1022) and submits the bid to CBB (1024). On the other hand, if sufficient data is available (1006), in step 1008, LLD obtains the base price and in step 1010, LLD calculates the risk factor. This risk is in terms of buying the license at a price and being required to sell a license for the same movie at a later time at a lower price. In step 1012, the inventory price is computed as the sum of the base price and a price based on the above risk factor. In step 1014, LLD obtains the market price from CBB and checks if the inventory price is less than or equal to the current market price (1016). If so, LLD sets the initial buying price as inventory price (1018) and submits the bid to CBB (1024). On the other hand, if it is cheaper to buy at current market price (1016), then in step 1020, LLD sets the initial buying price as current market price (1020) and the bid is submitted to CBB (1024).

FIG. 11 describes the steps involved in the negotiation to buy a license of a movie during trading process. In step 1102, LLD submits a bid with an initial buying price (BP) and waits for a notification from CBB. If the bid is accepted (1104), LLD receives a notification from CBB about the allotment of the movie license from the selling LLD (1106). In step 1108, LLD updates the billing information based on deal price and in step 110, LLD establishes connection with selling LLD for initiating the movie streaming. On the other hand, if the bid is not accepted (1104), LLD initiates the buy price negotiation to close the deal as quickly as possible. In step 1112, LLD determines the available time (TN) for negotiation. Note that the buying LLD is keen to get a license before the end of the current time slot so that the subscriber's request to view a movie in the next time slot can be met. If there is still time for negotiation (1114), then in step 1116, LLD computes negotiation margin (NM) as the difference between inventory price and current market price. In step 1118, LLD computes buy price increment (BI) based on NM and TN. In step 1120, LLD computes the revised buy price (RBP) as the sum of BP and BI. In step 1122, a check is made to determine whether the increments in the buying price has resulted in a case where the inventory price is lower than the buying bid price. If it is not so, then in step 1124, LLD submits the revised bid price to CBB. If on the other hand, if it is the case that the inventory price is lower than the buy price, then in step 1126, a check is made to determine whether the LLD can make use of its own license. This is because of the reason that using the license from LLD's own inventory has become more profitable than obtaining the same from CBB. If the license is available, then LLD stops the bidding process and uses the license from its inventory (1128). On the other hand, if the license is not available locally (1126), then in step 1130, a check is made if license is available with CBB and if available, in step 1132, the bid price is set to blank so as to obtain the license at any cost and this revised bid is submitted to CBB. If license is not available even globally, then in step 1134, LLD negotiates with the subscriber to choose an alternative slot and/or movie. If there is no more time for negotiation (1114), then the steps 1126 through 1134 are performed.

FIG. 12 describes the steps involved in the negotiation to sell a license of a movie during trading process. In step 1202, LLD submits a bid with an initial selling price (SP) and waits for a notification from CBB. If the bid is accepted (1204), LLD receives a notification from CBB about the allotment of the movie license to the buying LLD (1206). In step 1206, LLD updates the billing information based on deal price and in step 1210, LLD makes provision for streaming of the allotted movie in the allotted slot to the buying LLD. On the other hand, if the bid is not accepted (1204), LLD initiates the sell price negotiation to close the deal as quickly as possible. In step 1212, LLD determines the available time (TN) for negotiation. Note that the selling LLD is keen to sell the license before any possible license expiry. If there is still time for negotiation (1214), then in step 1216, LLD computes negotiation margin (NM) as the difference between current market price and base price. In step 1218, LLD computes sell price decrement (SD) based on NM and TN. In step 1220, LLD computes revised sell price(RSP) as the difference of SP and SD. In step 1222, a check is made to determine whether the increments in the selling price has resulted in a case where the selling bid price is lower than the base price. If it is not so, then in step 1224, LLD submits the revised bid price to CBB. If on the other hand, if it is the case that the revised sell price is lower than the base price, then in step 1226, LLD sets the selling price as blank, thereby claiming market dynamics advantage if any. In step 1228, LLD submits the revised bid to CBB. If there is no more time for negotiation (1214), then the steps 1226 and 1228 are performed.

FIG. 13 describes the steps involved in obtaining licenses from different LLDs by CBB. There are two distinct ways by which CBB obtains the licenses (1302). The first way is to obtain the licenses at the beginning of a slot (1304). At the beginning of a slot, LLDs identify the surplus licenses, assign PF factor to them, and communicate these surplus licenses to CBB for trading purposes. In step 1306, CBB updates Surplus License DB (1328) that contains information related to the surplus licenses such as the associated movie, owner LLD, license kind, and available number of licenses. The second way of obtaining licenses is to demand for surplus licenses from LLDs and is described in the steps 1308 through 1328. In step 1308, whenever there is an event of a subscriber logging into to the system, CBB determines the total number of currently logged in subscribers (S). In step 1310, CBB determines the number of available licenses (L). This number indicates the licenses that are available and can be allocated to the subscribers requesting for a movie through Billboard. In step 1312, CBB determines, heuristically, whether L is adequate. This is done by computing $T_2*M*S$ where $T_2$ is the number of posters per billboard and M is the multiplicity factor. M indicates the impact of having multiple licenses for the same movie and hence cannot as flexibly used as multiple single licenses for distinct movies. If adequate licenses are available, CBB does not demand additional licenses from LLDs. On the other hand, if the number of licenses available falls short, CBB, in step 1314, determines overall license requirements based on the number of subscribers logged in per LLD ($T_2*M*$ Number of logged in subscribers). In step 1316, CBB calculates the number of licenses to be requested from each LLD. One of the ways of computing is to apportion the need based on the portion of the number of licenses currently distributed to the LLDs. Alternatively, the required number of licenses can be distributed equally among the LLDs. In step 1318, CBB requests LLDs to provide the computed number of licenses. In step 1320, CBB receives the licenses from the LLDs. In step 1322, a check is made to determine whether sufficient licenses were received from LLDs. If not, in step 1324, CBB requests GLD to provide the remaining number of licenses. Finally, in step 1326, CBB updates Surplus License DB.

FIG. 14 describes the steps involved in distributing the licenses to the various LLDs. In step 1402, at the beginning of a slot, CBB determines the number of logged in subscribers per LLD. In step 1404, on the event of new logins, CBB determines the number of logged in subscribers per LLD. And in step 1406, on the event of logouts, CBB determines the number of logged in subscribers per LLD. In step 1408, CBB determines the number of licenses available for distribution using Surplus License DB. In step 1410, CBB determines average number of licenses ($A_L$) with an LLD based on the number of subscribers logged in and number of licenses presently allotted to the LLD. In step 1412, CBB computes the number of licenses to be distributed to each LLD so as to equalize the average number ($A_L$) of licenses across LLDs. This will ensure that the available licenses are distributed in a fair manner to the competing LLDs. In step 1414, CBB determines the most appropriate licenses on per LLD basis and distributes licenses to each LBB. One of the ways to ensure appropriateness is to avoid providing the license of a movie to an LLD that already has one or more licenses for that movie.

FIG. 15 describes the steps involved in pricing of licenses by CBB. In step 1502, different ways of global pricing of a license of a movie are described. In step 1504, pricing of licenses with PF equal to 0 is described. In step 1506, the base price of a license is determined. In step 1508, the number of licenses of the movie with PF equal to 0 is determined. In step 1510, discount factor for the movie with PF equal to 0 is determined. This discount is computed based on factors such as the number of license of the movie with PF=0 that are currently available in the market. This factor is in direct proportion to the number of licenses available in the market indicating that if currently there are large numbers of these licenses, then the discount has to be set higher to stimulate the demand for such licenses. In step 1512, the number of licenses with PF greater than 0 is determined and in step 1514, PF discount factor is computed. The PF discount factor is estimated as a function of the number of license of the movie with PF not equal to zero that are currently available in the market. This factor is in direct proportion to the number of licenses available in the market indicating that if currently there are large number of these license, then the discount has to set higher to stimulate the demand for such licenses. In step 1516, total discount, PF0 and PF discounts, is computed and the PF0 price of the license is determined as the difference of the base price and the total discount.

In step 1520, market price for a license of a movie is computed. This market price is used in trading whenever the buy or sell price is set to blank by bidders. In step 1522, CBB obtains the past k sale prices of a license of the movie during past trading sessions where k is a configurable parameter. If sufficient data is available for analysis (1524), then in step 1526, CBB calculates the weighted average of above k values and CBB sets current market price of the movie to this average price (1528). On the other hand, if sufficient data is not available (1524), then in step 1530, CBB sets current market price of the movie to the price obtained from GLD.

FIG. 16 describes the various steps involved in trading. In step 1602, CBB receives buyer's bids. The trading is initiated whenever one or more buyers submit their bids. In step 1604, CBB checks the availability of licenses with PF equal to zero. If such licenses are not available, then in step 1606, CBB analyses the bids from multiple sellers and selects a least bidding seller on first come first served basis. If there is no bid with blank sale bid (1608), then in step 1610, CBB analyses the bid from the buyer. If this bid is not blank, then in step 1612, CBB checks whether the buyer's bid exceeds the seller's bid. If so, then in step 1614, CBB assigns buyer's bid price as deal price and selects the seller with least bid price as a winner. If there are multiple sellers with the same least bid price, the winner is selected based on first-come-first-served basis. In step 1616, CBB notifies the deal price to the buying and selling LLDs and in step 1618, CBB updates Surplus License DB with the deal information.

On the other hand, if in step 1612, the buyer's bid did not exceed any of the sellers' bids, then in step 1620, CBB notifies deal failure to the buying and selling LLDs inviting them to revise their bids.

On the other hand, in step 1610, if the buyer's bid is blank, then in step 1622, CBB selects the least sale bid as the deal price, selects the seller with the least bid price as the winner, and performs the steps 1616 and 1618.

On the other hand, in step 1608, if there is a sale bid with blank price, then if the buyer's bid is not blank (1624), then in step 1626, CBB assigns the buyer's bid price as the deal price and performs steps 1616 and 1618. Otherwise, that is, the buyer's bid price is also blank (1624), then in step 1628, CBB assigns the current market price as the deal price and performs the steps 1616 and 1618.

On the other hand, in step 1604, if there are some licenses with PF equal to zero, then in step 1630, CBB assigns PF0 price as the deal price, selects the seller on first-come-first-served basis, and performs the steps 1616 and 1618.

Thus, a system and method for maximizing video license utilization based on billboard service to centrally manage available licenses in real-time has been disclosed. Although the present invention has been described particularly with reference to the figures, it will be apparent to one of the ordinary skill in the art that the present invention may appear in any number of systems that perform video license distribution. It is further contemplated that many changes and modifications may be made by one of ordinary skill in the art without departing from the spirit and scope of the present invention.

ACRONYM LIST

1. BBVLU BILLBOARD BASED VIDEO LICENSE UTILIZATION SYSTEM
2. CBB CENTRAL BILLBOARD
3. DB DATABASE
4. FCFS FIRST-COME-FIRST-SERVED
5. LLD LOCAL LICENSE DISTRIBUTOR
6. GLD GLOBAL LICENSE DISTRIBUTOR
7. LAS LICENSE ASSESMENT SYSTEM
8. LBB LOCAL BILLBOARD
9. PF PERISHABILITY FACTOR
10. PLD PERIODIC LICENSE DISTRIBUTION
11. SLA SERVICE LEVEL AGREEMENT

What is claimed is:

1. A system for maximizing the utilization of a plurality of licenses in the context of video distribution to a plurality of plurality of subscribers, said system comprising:
    means for computing a plurality of surplus licenses;
    means for distributing said plurality of surplus licenses among said plurality of plurality of subscribers;
    means for selling said plurality of surplus licenses; and
    means for responding to a buying bid based on said plurality of surplus licenses,
    wherein said means for computing said plurality of surplus licenses comprises:
        processing on-demand license requests;
        determining available licenses (La);
        determining number of logged in subscribers (S) of said plurality of plurality of subscribers;
        determining multiplicity factor (M) associated with said plurality of plurality of licenses;
        computing required licenses (Lr), wherein said computing is based on the product S*M*T wherein T is a pre-defined threshold;
        checking Lr with available licenses (La);
        ordering La with respect to S in decreasing order; and
        computing said plurality of surplus licenses (Ls) as top La−Lr licenses if La>Lr.

2. The system of claim 1, wherein said means for selling said plurality of surplus licenses comprises:
    checking if PF, perishability factor, of a license of said plurality of surplus licenses is 0;
    checking if said license needs to be sold on priority;
    setting selling price (SeP) of said license as blank; and
    submitting selling price SeP as bid.

3. The system of claim 2, wherein said means for selling said plurality of surplus licenses further comprises:
    obtaining base price (Bp) of a license of said plurality of surplus licenses;
    computing of profit factor (Pp) of said license based on PF, perishability factor, with higher PF leading higher profits;
    computing risk factor (Rp) wherein said computing is based on predicted demand for said license over a pre-defined time interval, average (D) of deviations of the predictions from the actual usages in the past over said pre-defined time interval, and computing C/D wherein C is a pre-defined constant;
    computing inventory price (Ip) as the sum of Bp, Pp, and Rp;
    obtaining market price (Mp) for said license;
    setting selling price (SeP) as Ip if Ip>Mp;
    setting SeP as Mp if Ip not >Mp; and
    submitting selling price SeP as bid.

4. The system of claim 2, wherein said means for selling of said plurality of surplus licenses further comprises means for negotiating price of a license of said plurality of surplus licenses, wherein said negotiation comprises:
    determining available time for negotiation (TN);
    computing negotiation margin (NM) as difference between market price and base price (Bp);
    computing sell price decrement (SD) based on TN and NM;
    computing revised selling price (RSP) as the difference of selling price and SD;
    checking if RSP<Bp; setting RSP as blank if TN<a pre-defined threshold; and
    submitting RSP as bid.

5. The system of claim 1, wherein said means for distributing said plurality of surplus licenses among said plurality of plurality of subscribers comprises:
   determining the number of licenses available for distribution;
   determining average number of license (Al) with each of said plurality of plurality of subscribers based on number of logged in subscribers and numbers of assigned licenses;
   computing the number of license (Ad) to be distributed to each of said plurality of plurality of subscriber such that sum of Al and Ad across each of said plurality of plurality of subscribers is about the same; and
   distributing Ad licenses to each of said plurality of subscribers.

6. The system of claim 1, wherein said means for responding to a buying bid based on said plurality of surplus licenses comprises:
   computing price of said plurality of surplus licenses, wherein said computing comprises:
      determining base price (Bp) of a license of said plurality of surplus licenses;
      determining the number of licenses (L1) of said plurality of surplus licenses with PF, perishability factor, value of 0;
      computing PF0 discount factor (PF0p) based on L1;
      determining the number of licenses (L2) of said plurality of licenses with PF>0;
      computing PF discount factor (PFp) based on L2; and
      computing PF0-Price as Bp−PF0p−PFp.

7. The system of claim 6, wherein said means for responding further comprises means for trading of a license of said plurality of surplus licenses, wherein said trading comprises:
   receiving a buying bid for said license;
   checking for availability of said license with PF, perishability factor, value of 0;
   assigning PF0-Price of said license as deal price (Dp); and
   selecting a selling bid on first come first served basis.

8. The system of claim 6, wherein said means for responding further comprises means for trading of a license of said plurality of surplus licenses, wherein said trading comprises:
   receiving a buying bid for said license;
   identifying a selling bid with the least bid on first come first served basis;
   checking for blank buying and selling bid, and assigning market price of said license as deal price (Dp);
   checking for blank selling bid and assigning said buying bid as deal price (Dp);
   checking for blank buying bid and assigning said selling bid as deal price (Dp); and
   checking for said buying bid as greater than or equal to said selling bid, and assigning said buying bid as deal price (Dp).

9. A system for maximizing the utilization of a plurality of licenses in the context of video distribution to a plurality of plurality of subscribers, said system comprising:
   means for computing a plurality of surplus licenses;
   means for distributing said plurality of surplus licenses among said plurality of plurality of subscribers;
   means for selling said plurality of surplus licenses; and
   means for responding to a buying bid based on said plurality of surplus licenses,
   wherein said means for computing said plurality of surplus licenses comprises:
      processing on-demand license requests;
      determining available licenses (La);
      determining number of logged in subscribers (s) of said plurality of plurality of subscribers;
      determining multiplicity factor (M) associated with said plurality of plurality of licenses;
      computing required licenses (Lr), wherein said computing is based on the product S*M*T wherein T is a pre-defined threshold;
      checking Lr with available licenses (La);
      ordering of La with respect to S in decreasing order; and
      computing said plurality of surplus licenses (Ls) as top La−Lr licenses if La>Lr,
   wherein said means for distributing said plurality of surplus licenses further comprises:
      determining the number of licenses available for distribution;
      determining average number of licenses (Al) with each of said plurality of plurality of subscribers based on number of logged in subscribers and number of assigned licenses;
      computing the number of licenses (Ad) to be distributed to each of said plurality of plurality of subscribers such that sum of Al and Ad across each of said plurality of plurality of subscribers is about the same; and
      distributing Ad licenses to each of said plurality of plurality of subscribers,
   wherein said means for selling said plurality of surplus licenses comprises:
      checking if PF, perishability factor, of a license of said plurality of surplus licenses is 0;
      checking if said license needs to be sold on priority;
      setting selling price (SeP) of said license as blank; and
      submitting selling price SeP as bid,
   wherein said means for responding to a buying bid further comprises:
      computing price of said plurality of surplus licenses, wherein said computing comprises:
         determining base price (Bp) of a license of said plurality of surplus licenses;
         determining the number of licenses (L1) of said plurality of surplus licenses with PF, perishability factor, value of 0;
         computing PF0 discount factor (PF0p) based on L1;
         determining the number of licenses (L2) of said plurality of licenses with PF>0; and computing PF discount factor (PFp) based on L2; and
         computing PF0-Price as Bp−PF0p−PFp.

10. The system of claim 9, wherein said means for selling said plurality of surplus licenses further comprises:
   obtaining base price (Bp) of a license of said plurality of surplus licenses;
   computing of profit factor (Pp) of said license based on PF, perishability factor, with higher PF leading higher profits;
   computing risk factor (Rp) wherein said computing is based on predicted demand for said license over a pre-defined time interval, average (D) of deviations of the predictions from the actual usages in the past over said pre-defined time interval, and computing C/D wherein C is a pre-defined constant;
   computing inventory price (Ip) as the sum of Bp, Pp, and Rp;
   obtaining market price (Mp) for said license;
   Setting selling price(SeP)as Ip if Ip>Mp;
   setting SeP as Mp if Ip not>Mp,and
   submitting selling price SeP as bid.

11. The system of claim 9, wherein said means for selling of said plurality of surplus licenses further comprises means for negotiating price of a license of said plurality of surplus licenses, wherein said negotiation comprises:
  determining available time for negotiation (TN);
  computing negotiation margin (NM) as difference between market price and base price (Bp);
  computing sell decrement (SD) based on TN and NM;
  computing revised selling (RSP) as the difference of selling price and SD;
  checking if RSP<Bp;
  setting RSP as blank if TN<a pre-defined treshold and submitting RSP as bid.

12. The system of claim 9, wherein said means for responding further comprises means for trading of a license of said plurality of surplus licenses, wherein said trading comprises:
  receiving a buying bid for said license;
  hecking for availability of said license with PF, perishability factor, value of 0;
  assigning PF0-Price of said license as deal price (Dp); and
  selecting a selling bid on first come first served basis.

13. The system of claim 9, wherein said means for responding further comprises means for trading of a license of said plurality of surplus licenses, wherein said trading comprises:
  receiving a buying bid for said license;
  identifying a selling bid with the least bid on first come first served basis;
  checking for blank buying and selling bid, and assigning market price of said license as deal price (Dp);
  checking for blank selling bid and assigning said buying bid as deal price (Dp);
  checking for blank buying bid and assigning said selling bid as deal price (Dp); and
  checking for said buying bid as greater than or equal to said selling bid, and assigning said buying bid as deal price (Dp).

\* \* \* \* \*